United States Patent
Matsushima et al.

(10) Patent No.: US 7,830,481 B2
(45) Date of Patent: Nov. 9, 2010

(54) LIQUID CRYSTAL DISPLAY DEVICE WITH RETARDATIONS OF OPTICAL FILMS AND LIQUID CRYSTAL LAYER

(75) Inventors: Jin Matsushima, Kawasaki (JP); Ken Sumiyoshi, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 481 days.

(21) Appl. No.: 11/866,230

(22) Filed: Oct. 2, 2007

(65) Prior Publication Data

US 2008/0100786 A1    May 1, 2008

(30) Foreign Application Priority Data

Oct. 27, 2006    (JP)  .............................. 2006-292328

(51) Int. Cl.
*G02F 1/1335*    (2006.01)

(52) U.S. Cl. ........................ 349/119; 349/117; 349/118; 349/120; 349/121; 349/105; 349/113; 349/114

(58) Field of Classification Search ................. 349/105, 349/117–121
See application file for complete search history.

(56) References Cited

U.S. PATENT DOCUMENTS

| | | | |
|---|---|---|---|
| 6,801,283 B2 * | 10/2004 | Koyama et al. | ............. 349/119 |
| 7,215,839 B2 * | 5/2007 | Kawahara et al. | ............. 385/11 |
| 2004/0241344 A1 * | 12/2004 | Kawanishi et al. | ........... 428/1.1 |
| 2008/0075892 A1 * | 3/2008 | Ichihashi et al. | ............. 428/1.3 |
| 2009/0116109 A1 * | 5/2009 | Konishi et al. | .............. 359/500 |

FOREIGN PATENT DOCUMENTS

| | | |
|---|---|---|
| JP | 3380482 B2 | 12/2002 |
| JP | 2003-344837 A | 12/2003 |
| JP | 2005-106967 A | 4/2005 |
| JP | 2006-39369 A | 2/2006 |

* cited by examiner

*Primary Examiner*—Hoan C Nguyen
(74) *Attorney, Agent, or Firm*—Sughrue Mion, PLLC

(57) ABSTRACT

A first polarizer and a second polarizer have respective absorption axes extending approximately perpendicularly to each other, and a first retardation plate and a third retardation plate have respective slow axes extending approximately perpendicularly to each other. The first retardation plate and the third retardation plate have respective retardations that are approximately equal to each other, and have respective Nz coefficients that are approximately equal to each other. A second retardation plate and a liquid crystal layer in a transmissive display area have a slow axis and an orientation axis, respectively, extending approximately perpendicularly to each other. The second retardation plate and the liquid crystal layer in the transmissive display area have respective retardations that are approximately equal to each other.

9 Claims, 14 Drawing Sheets

Equal contrast ratio contour

Equal contrast ratio contour

Equal contrast ratio contor

Equal contrast ratio contour

LIQUID CRYSTAL DISPLAY DEVICE WITH RETARDATIONS OF OPTICAL FILMS AND LIQUID CRYSTAL LAYER

BACKGROUND OF THE INVENTION

1. Field of the Invention

The present invention relates to a liquid crystal display device, an optical film for use in the liquid crystal display device, and a terminal device incorporating the liquid crystal display device. More particularly, the present invention relates to a liquid crystal display device with excellent oblique viewing angle characteristics, an optical film for use in the liquid crystal display device, and a terminal device incorporating the liquid crystal display device.

2. Description of the Related Art

Display devices which employ liquid crystals, which are low in profile, light in weight, small in size, and of low power requirements, have recently been used in a wide variety of terminal devices including large-size terminal devices such as monitors, television sets, etc., medium-size terminal devices such as notebook personal computers, cash dispensers, automatic dispensing machines, etc., and small-size terminal devices such as personal television sets, PDAs (Personal Digital Assistants), mobile phones, portable game machines, etc.

The display devices which employ liquid crystals need to use a light source to enable the user to view displayed information because the liquid crystal molecules do not emit light themselves. Generally, liquid crystal display devices are classified into a transmissive type, a reflective type, and a semitransmissive type which uses transmitted light and reflected light in combination. The reflective liquid crystal display devices can be of low power requirements because they use external light for display. However, since the reflective liquid crystal display devices have poorer display properties such as contrast ratio than the transmissive liquid crystal display devices, the transmissive liquid crystal display devices and the semitransmissive liquid crystal display devices are mainstream liquid crystal display devices at present. The transmissive liquid crystal display devices and the semitransmissive liquid crystal display devices have a light source unit disposed behind the liquid crystal panel for displaying information based on light emitted by the light source unit. In particular, since the medium- and small-size liquid crystal display devices are carried around and used in various environments by the users, they are constructed as semitransmissive liquid crystal display devices which provide high image visibility by allowing the users to see reflective displayed images in bright places and transmissive displayed images in dark places.

Liquid crystal panels used in the semitransmissive liquid crystal display devices have been used in an ECB (Electrically Controlled Birefringence) mode and a multidomain vertical alignment mode that enables higher image quality and wider viewing angles. Recently, there have been proposed attempts to apply a lateral electric field mode which provides a wide viewing angle, in principle, to semitransmissive liquid crystal display devices.

An Nz coefficient and the angle dependence of a retardation which are used in the description of the present invention will be described below. The Nz coefficient is defined as:

$$Nz=(nx-nz)/(nx-ny) \qquad (1)$$

where nx represents the refractive index in a direction (slow axis) exhibiting the maximum refractive index within the film plane of the birefringent medium of a retardation plate, ny the refractive index in an in-plane direction perpendicular to the direction, and nz the refractive index in a thickness-wise direction.

A retardation Re(0) with respect to light from the direction normal to the retardation plate is determined by the difference between the refractive indexes nx, ny in the main-axis direction within the plane and the thickness d of the retardation plate, as expressed by the following equation (2):

$$Re(0)=(nx-ny) \times d \qquad (2)$$

Light at an angle from the normal direction, as viewed obliquely to the retardation plate, is affected not only by the retardation determined by nx, ny only, but also by the main-axis refractive index nz in the thickness-wise direction and an increased optical path provided by the inclination from the normal direction. In the present description, the retardation of light from the direction normal to the film plane is simply referred to as a retardation or Re(0), and the retardation of light traveling from air into the retardation plate at an angle of θ from the normal direction to the film plane is referred to as an oblique-view retardation or Re(θ). In particular, if the inclination θ is in a direction toward the slow axis, then the retardation is referred to as Rex(θ), and if the inclination θ is in a direction in a plane perpendicular to the slow axis, the retardation is referred to as Rey(θ).

With respect to a retardation plate used in a liquid crystal display device, it is known that the relationship between Re(θ), Rex(θ), and Rey(θ) is dependent on the Nz coefficient as follows: With respect to a retardation plate where Nz=1, nz=ny according to equation (1), and the index ellipsoid is in the shape of a rugby ball which is longest along the slow axis when observed from the direction normal to the substrate. At this time, Re(0)>Rex(θ) and Re(0)<Rey(θ).

With respect to a retardation plate where Nz=0, nz=nx according to equation (1), and the index ellipsoid is of a shape which is longest along the slow axis and thickness-wise direction. At this time, Re(0)<Rex(θ) and Re(0)>Rey(θ).

With respect to a retardation plate where Nz=0.5, nz=(nx+ny)/2 and the index ellipsoid is of a shape intermediate between the shape having retardation plate where Nz=1 and the shape with the retardation plate where Nz=0. When the inclination θ is in a direction toward the slow axis, Re(0)≈Rex(θ) and Re(0)≈Rey(θ) in a wide range of θ.

FIG. 1 is a schematic perspective view of a lateral-electric-field semitransmissive liquid crystal display device disclosed in JP2005-106967A, which is relevant to the present invention. In FIG. 1, an XYZ orthogonal coordinate system is established as follows: A direction from liquid crystal layer 2006a toward polarizer 2002 is defined as a +Z direction and an opposite direction as a −Z direction. Lateral directions in FIG. 1 are defined as X-axis directions, particularly a rightward direction as a +X direction and a leftward direction as a −X direction. A +Y direction is represented by a direction according to the right-handed coordinate system. Specifically, when the thumb of the right hand of a person points in the +X direction and the index finger points in the +Y direction, then the middle finger points in the +Z direction. In the schematic perspective view of the liquid crystal display device shown in FIG. 1, the liquid crystal display device comprises a polarizer, a retardation plate, liquid crystal layers, and a reflector. The disposition angle of the retardation plate is expressed as an angle formed between the slow axis of the retardation plate and the X-axis. A counterclockwise direction is defined as positive. Similarly, the disposition angle of the polarizer is expressed as an angle formed between the absorption axis of the polarizer and the X-axis.

Similarly, the disposition angle of the liquid crystal layers which are horizontally oriented is expressed as an angle formed between the orientation axis of the liquid crystal layers and the X-axis when no voltage is applied to the liquid crystal.

Liquid crystal layers 2006a, 2006b comprise two regions including a transmissive region and a reflective region having a reflector. A transmissive display area of the liquid crystal display device as viewed from a display surface comprises polarizer 2002, half-wavelength plate 2005 in which Nz=1, liquid crystal layer 2006a, retardation plate 2004 in which Nz=0, half-wavelength plate 2003 in which Nz=0, and polarizer 2001 which are successively arranged in the order named. A reflective display area of the liquid crystal display device as viewed from the display surface comprises polarizer 2002, half-wavelength plate 2005 in which Nz=1, liquid crystal layer 2006b, and reflector 2007 which are successively arranged in the order named.

Liquid crystal layers 2006a, 2006b in the reflective display area and the transmissive display area are horizontally oriented. The retardation of liquid crystal layer 2006b in the reflective display area is represented by a quarter wavelength, and the retardation of liquid crystal layer 2006a in the transmissive display area is represented by a value that is slightly smaller than 2 times, i.e., 1.7 to 1.9 times, the retardation in the reflective display area. If one wavelength is 550 nm, then the retardation of liquid crystal layer 2006a in the transmissive display area is set to a value ranging from 233.8 nm to 261.2 nm.

The disposition angle of polarizer 2002 is 90 degrees. The disposition angle of half-wavelength plate 2005 in which Nz=1 is 15 degrees. The disposition angle of liquid crystal layers 2006a, 2006b is 75 degrees. The disposition angle of retardation plate 2004 in which Nz=0 is 165 degrees. The disposition angle of half-wavelength plate 2003 in which Nz=0 is 105 degrees. The disposition angle of polarizer 2001 is 0 degree. Polarizer 2002, half-wavelength plate 2005 in which Nz=1, and liquid crystal layer 2006b in the reflective display area jointly make up a circular polarizer in a wide range of visible wavelengths (referred to as a wide-range circular polarizer).

Retardation plate 2004 in which Nz=0, half-wavelength plate 2003 in which Nz=0, and polarizer 2001 are paired respectively with liquid crystal layer 2006a in the transmissive display area, half-wavelength plate 2005 in which Nz=1, and polarizer 2002. Specifically, the retardation of retardation plate 2004 in which Nz=0 is the same as the retardation of liquid crystal layer 2006a in the transmissive display area, and the slow axis of retardation plate 2004 in which Nz=0 is perpendicular to the oriented direction of liquid crystal layer 2006a in the transmissive display area. Accordingly, the retardation of retardation plate 2004 in which Nz=0 and the retardation of liquid crystal layer 2006a in the transmissive display area cancel each other out.

If a birefringent medium in which Nz=1 and a birefringent medium in which Nz=0 are arranged with their slow axes being perpendicular to each other in the direction normal to the substrate, then the slow axes of the birefringent medium in which Nz=1 and the birefringent medium in which Nz=0 are kept perpendicular to each other in all visual directions. Since their retardations cancel each other out in a wide viewing angle range, the viewing angle is increased.

Since liquid crystal layer 2006a in the transmissive display area is horizontally oriented and the nematic liquid crystal is represented by nx>ny=nz, liquid crystal layer 2006a in the transmissive display area has Nz=1. Consequently, the retardations of retardation plate 2004 in which Nz=0 and liquid crystal layer 2006a in the transmissive display area cancel each other out not only in the direction normal to the substrate, but also in a wide viewing angle range.

The retardation of half-wavelength plate 2003 in which Nz=0 is the same as the retardation of half-wavelength plate 2005 in which Nz=1 which is paired therewith, and the slow axis of half-wavelength plate 2003 in which Nz=0 is perpendicular to the slow axis of half-wavelength plate 2005 in which Nz=1. Consequently, the retardations of half-wavelength plate 2003 in which Nz=0 and half-wavelength plate 2005 in which Nz=1 cancel each other out in a wide viewing angle range.

When no voltage is applied to the liquid crystal of the lateral-electric-field semitransmissive liquid crystal display device disclosed in JP2005-106967A, light that has passed through polarizer 2002, half-wavelength plate 2005 in which Nz=1, and liquid crystal layer 2006b in the reflective display area, which jointly make up the circular polarizer, is circularly polarized. The light is converted into opposite circularly polarized light when it is reflected by reflector 2007, and cannot pass through the circular polarizer. Therefore, the reflective display area displays black when no voltage is applied. When voltage is applied to the liquid crystal, since the birefringence of the liquid crystal layer in the reflective display area is changed, polarizer 2002, half-wavelength plate 2005 in which Nz=1, and liquid crystal layer 2006b in the reflective display area do not serve as a circular polarizer, and white is displayed as the light is emitted therethrough. Accordingly, the liquid crystal display device operates as a normally black reflective display device.

In the transmissive display area when no voltage is applied to the liquid crystal, as the retardations of the two birefringent mediums that are present between polarizer 2001 and polarizer 2002 cancel each other out in a wide viewing angle range, the mediums between polarizer 2001 and polarizer 2002 provide a phase which is nearly isotropic. Since the transmission axes of polarizer 2001 and polarizer 2002 are perpendicular to each other, the transmissive display area will ideally displays black. When voltage is applied to the liquid crystal, since the birefringence of liquid crystal layer 2006a in the trans-missive display area is changed, the light is emitted therethrough, displaying white. Accordingly, the liquid crystal display device operates as a normally black transmissive display device.

JP2005-106967A states that a half-wavelength plate in which Nz=1 may be combined instead of half-wavelength plate 2003 in which Nz=0 and a half-wavelength plate in which Nz=0 may be combined instead of half-wavelength plate 2005 in which Nz=1.

As described above, the semitransmissive liquid crystal display device wherein the lateral electric field mode electrodes serve as the reflective display area and the mediums between the lateral electric field mode electrodes serve as the transmissive display area is disclosed in JP2005-106967A.

However, the liquid crystal display device described above is problematic in that the viewing angle characteristics of the reflective display area are not increased, and also in that it is highly costly to manufacture because the retardation plates of types having increased characteristics are used. Furthermore, since the types of the paired retardation plates are different from each other, the contrast ratio of the transmissive display is possibly reduced. These three problems will be described in detail below.

The viewing angle characteristics of a liquid crystal display device whose reflective display area comprises a circular polarizer are determined by the viewing angle characteristics of the circular polarizer. In the above liquid crystal display device, polarizer 2002, half-wavelength plate 2005 in which Nz=1 (or a half-wavelength plate in which Nz=0), and liquid crystal layer 2006b in the reflective display area jointly make up a wide-range circular polarizer. With respect to light from the normal direction to the substrate, they function as a wide-range circular polarizer to reduce the leakage of light to enable higher contrast ratio when black is displayed. With respect to light at an angle inclined from the normal direction, i.e., as light is obliquely viewed, it is affected by the main-axis refractive index nz in the thickness-wise direction and an increased optical path provided by the inclination from the normal. Therefore, when the light is obliquely viewed, half-wavelength plate 2005 in which Nz=1 (or a half-wavelength plate in which Nz=0) and liquid crystal layer 2006b in the reflective display area deviate from the design values of the wide-range circular polarizer, resulting in an increased leakage of light when black is displayed and a reduction in the contrast ratio. Consequently, the above liquid crystal display device is disadvantageous in that the viewing angle characteristics of the reflective display area are not increased.

The retardation plates of the above liquid crystal display device include half-wavelength plate 2003 in which Nz=0, retardation plate 2004 in which Nz=0 which is designed to match the retardation ranging from 233.8 nm to 261.2 nm of liquid crystal layer 2006a, and half-wavelength plate 2005 in which Nz=1. Accordingly, the liquid crystal display device requires three retardation plates of three types, and hence is costly to manufacture.

Half-wavelength plate 2003 in which Nz=0 and half-wavelength plate 2005 in which Nz=1 need to be paired with each other to cancel out their retardations in order to prevent the contrast ratio of the transmissive display from being lowered. For example, polystyrene is known as the material of a retardation plate in which Nz=0 and polycarbonate as the material of a retardation plate in which Nz=1. Thus, the materials of a retardation plate in which Nz=0 and a retardation plate in which Nz=1 are different from each other. Therefore, half-wavelength plate 2003 in which Nz=0 and half-wavelength plate 2005 in which Nz=1 have different refractive index wavelength dispersions and have their retardations not sufficiently canceled. If the retardations Re(0) of half-wavelength plate 2003 in which Nz=0 and half-wavelength plate 2005 in which Nz=1 are not sufficiently canceled out, then the contrast ratio of the transmissive display is lowered.

SUMMARY OF THE INVENTION

An exemplary object of the invention is to provide a liquid crystal display device having excellent oblique viewing angle characteristics while using fewer types of retardation plates, an optical film for use in the liquid crystal display device, and a terminal device incorporating the liquid crystal display device.

According to an exemplary aspect of the present invention, there is provided a liquid crystal device including first and second substrates and liquid crystal layers sandwiched between the first and second substrates, and including a reflective display area and a transmissive display area as pixel areas, the arrangement being such that the liquid crystal layer in at least the transmissive display area can be energized in a lateral electric field mode when a voltage is applied parallel to the plane of the substrates, wherein a first retardation plate and a first polarizer are stacked on a surface of the first substrate remote from the liquid crystal layer in an order toward the first substrate, and a second retardation plate, a third retardation plate, and a second polarizer are stacked on a surface of the second substrate remote from the liquid crystal layer in an order toward the second substrate;

the first retardation plate and the third retardation plate have respective slow axes extending substantially perpendicularly to each other, and the second retardation plate and the liquid crystal layer in the transmissive display area have a slow axis and an orientation axis, respectively, extending substantially perpendicularly to each other;

the retardation with respect to light applied from the direction normal to the first retardation plate to the first retardation plate is defined as $Re1(0)$, the retardation with respect to light applied from the air to the first retardation plate at an angle of 40 degrees from the direction of the normal to the first retardation plate toward the slow axis of the first retardation plate is defined as $Re1x(40)$, and the retardation with respect to light applied from the air to the first retardation plate at an angle of 40 degrees from the direction normal to the first retardation plate toward a direction perpendicular to the slow axis of the first retardation plate is defined as $Re1y(40)$;

the retardation with respect to light applied from the direction normal to the second retardation plate to the second retardation plate is defined as $Re2(0)$, the retardation with respect to light applied from the air to the second retardation plate at an angle of 40 degrees from the direction normal to the second retardation plate toward the slow axis of the second retardation plate is defined as $Re2x(40)$, and the retardation with respect to light applied from the air to the second retardation plate at an angle of 40 degrees from the direction normal to the second retardation plate toward a direction perpendicular to the slow axis of the second retardation plate is defined as $Re2y(40)$;

the retardation with respect to light applied from the direction normal to the third retardation plate to the third retardation plate is defined as $Re3(0)$, the retardation with respect to light applied from the air to the third retardation plate at an angle of 40 degrees from the direction normal to the third retardation plate toward the slow axis of the third retardation plate is defined as $Re3x(40)$, and the retardation with respect to light applied from the air to the third retardation plate at an angle of 40 degrees from the direction normal to the third retardation plate toward a direction perpendicular to the slow axis of the third retardation plate is defined as $Re3y(40)$;

the retardation with respect to light applied from the direction normal to the liquid crystal layer in the transmissive display area to the liquid crystal layer is defined as $ReLC(0)$, the retardation with respect to light applied from the air to the liquid crystal layer at an angle of 40 degrees from the direction normal to the liquid crystal layer toward the orientation axis of the liquid crystal layer is defined as $ReLCx(40)$, and the retardation with respect to light applied from the air to the liquid crystal layer at an angle of 40 degrees from the direction normal to the liquid crystal layer toward a direction perpendicular to the orientation axis of the liquid crystal layer is defined as $ReLCy(40)$; and $Re1(0)$ and $Re3(0)$ are approximately equal to each other, $Re1(0)$, $Re1x(40)$, $Re1y(40)$, $Re3(0)$, $Re3x(40)$, and $Re3y(40)$ are approximately equal to each other, $Re2(0)$ and $ReLC(0)$ are approximately equal to each other, $Re2x(40)$ and $ReLCy(40)$ are approximately equal to each other, and $Re2y(40)$ and $ReLCx(40)$ are approximately equal to each other.

DESCRIPTION OF THE EXEMPLARY EMBODIMENTS

First Exemplary Embodiment

Figure 2A:
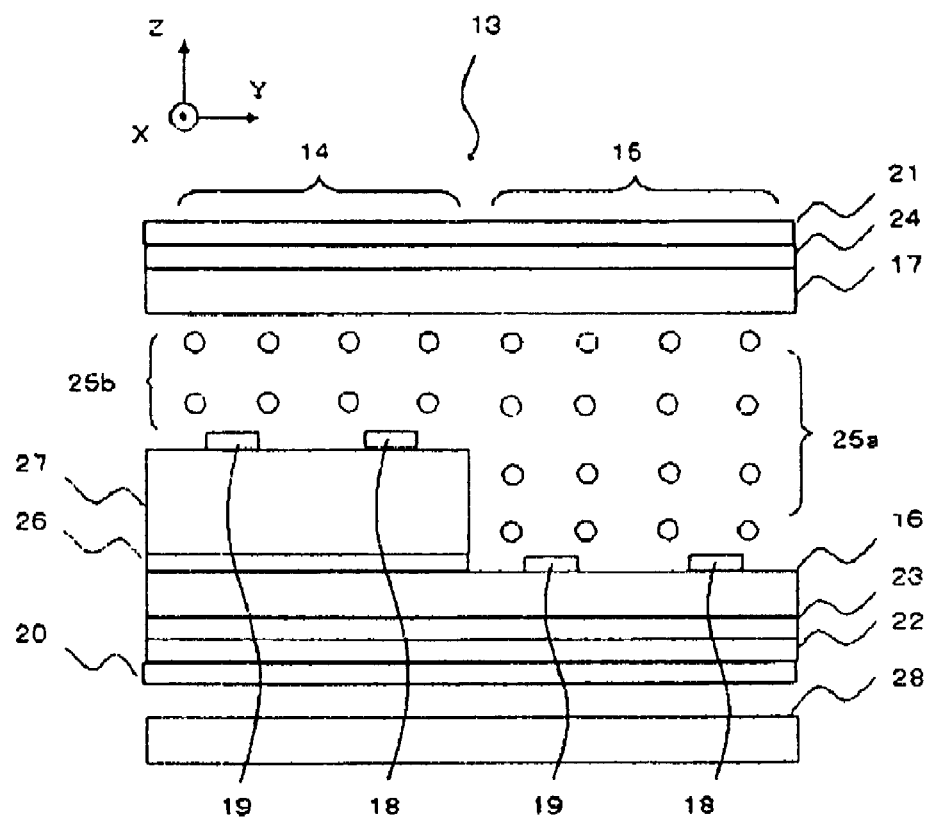
FIG. 2A is a schematic cross-sectional view of a liquid crystal display device according to a first exemplary embodiment of the present invention.

FIG. 2A shows in cross section a liquid crystal display device according to a first exemplary embodiment of the present invention. The liquid crystal display device according to the first exemplary embodiment of the present invention will be described below with reference to FIG. 2A.

As shown in FIG. 2A, liquid crystal display device 13 according to the first exemplary embodiment includes observer-side substrate 17 and backlight-side substrate 16 which are spaced in confronting relation to each other by a small clearance therebetween, and liquid crystal layers 25a, 25b held between observer-side substrate 17 and backlight-side substrate 16. Two types of electrodes, i.e., pixel electrodes 18 and common electrodes 19, are disposed on the surface of backlight-side substrate 16 which faces liquid crystal layers 25a, 25b. Pixel electrodes 18 and common electrodes 19 are in the form of comb teeth and are alternately arrayed in a direction (Y direction) perpendicular to the longitudinal directions of the comb teeth. Pixel electrodes 18 and common electrodes 19 are made of a transparent electric conductor such as ITO (indium tin oxide) or the like. Reflector 26 and insulating layer 27 are disposed between some of pixel electrodes 18 and common electrodes 19 and backlight-side substrate 16.

Liquid crystal display device 13 as viewed from its display surface is divided into a portion, which includes reflector 26, operating as reflective display area 14 and a remaining portion operating as transmissive display area 15. Liquid crystal display device 13 is made up of a matrix of pixels each comprising reflective display area 14 and transmissive display area 15. The thickness of liquid crystal layer 25b in reflective display area 14 is smaller than the thickness of liquid crystal layer 25a in transmissive display area 15 because of reflector 26 and insulating layer 27. First retardation plate 24 is disposed on the surface of observer-side substrate 17 remote from liquid crystal layers 25a, 25b, and first polarizer 21 is disposed on first retardation plate 24 remote from observer-side substrate 17. Similarly, second retardation plate 23 is disposed on the surface of backlight-side substrate 16 remote from liquid crystal layers 25a, 25b, and third retardation plate 22 and second polarizer 20 are disposed on second retardation plate 23 remote from backlight-side substrate 16.

Backlight 28 which operates as a light source for transmissive display area 15 is disposed beneath second polarizer 20.

In the present description, an XYZ orthogonal coordinate system is established as follows: A direction from liquid crystal layers 25a, 25b toward first polarizer 21 is defined as a +Z direction and an opposite direction as a −Z direction. The +Z direction and the −Z direction will collectively be referred to as Z-axis directions. Lateral directions in FIG. 2A are defined as Y-axis directions, particularly a rightward direction as a +Y direction and a leftward direction as a −Y direction. A +X direction is represented by a direction according to the right-handed coordinate system. Specifically, when the thumb of the right hand of a person points in the +X direction and the index finger points in the +Y direction, then the middle finger points in the +Z direction.

In the XYZ orthogonal coordinate system thus established, pixel electrodes 18 and common electrodes 19 are alternately arrayed in the Y-axis directions. The directions in which pixel electrodes 18 and common electrodes 19 extend, i.e., the longitudinal directions of the comb teeth thereof, are the X-axis directions. The display surface of liquid crystal display device 13 lies in an XY plane. Backlight 28, second polarizer 20, third retardation plate 22, second retardation plate 23, backlight-side substrate 16, liquid crystal layers 25a, 25b, observer-side substrate 17, first retardation plate 24, and first polarizer 21 are successively arranged in the order named in the +Z direction.

Figure 2B:
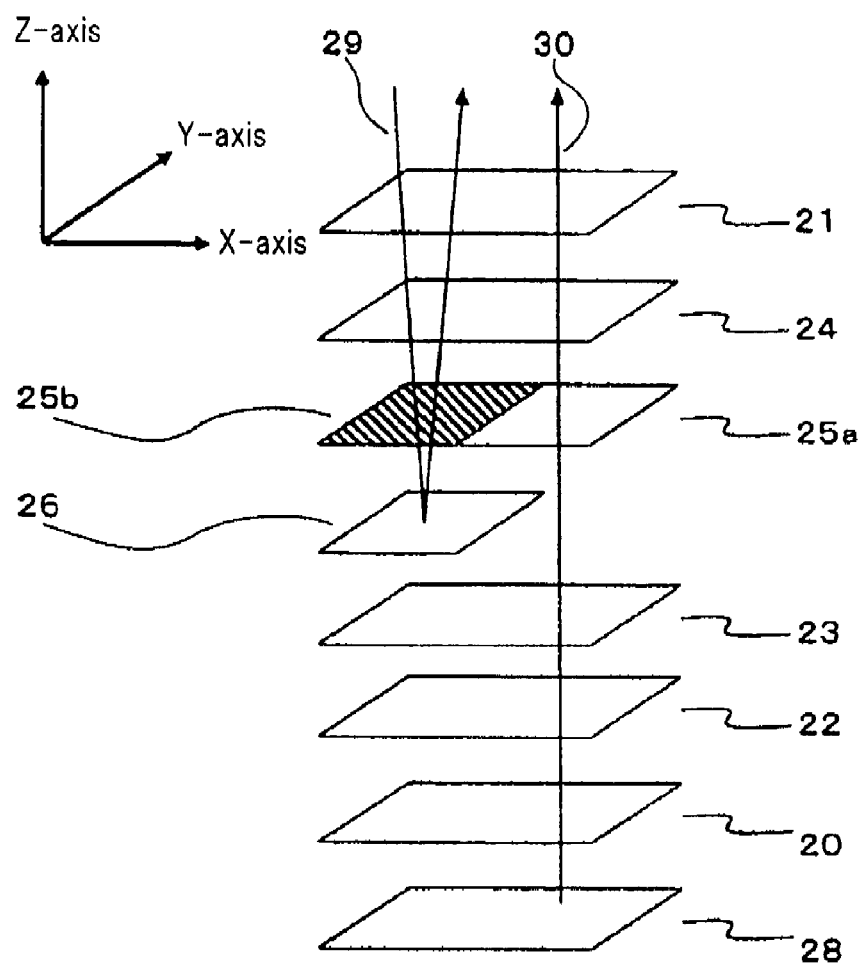
FIG. 2B is a schematic perspective view of the liquid crystal display device and an optical film according to the first exemplary embodiment of the present invention.

FIG. 2B shows in schematic perspective the liquid crystal display device and an optical film according to the first exemplary embodiment of the present invention. In FIG. 2B, the same XYZ orthogonal coordinate system as shown in FIG. 2A is established. Disposition angles are defined in the same manner as in FIGS. 2A and 2B.

As shown in FIG. 2B, the liquid crystal display device according to the first exemplary embodiment has liquid crystal layer 25a in the transmissive display area and liquid crystal layer 25b in the reflective display area. The liquid crystal display device has electrodes arranged for energizing liquid crystal layer 25a in the transmissive display area in the lateral electric field mode. Liquid crystal layer 25b in the reflective display area may be energized in either the lateral electric field mode or in the vertical electric field mode. Reflector 26 is disposed on the side of liquid crystal layer 25b in the reflective display area which is closer to backlight 28.

First retardation plate 24 is disposed on the observer side of liquid crystal layers 25a, 25b, and first polarizer 21 is disposed on first retardation plate 24. Similarly, second retardation plate 23 is disposed on the backlight side of liquid crystal layers 25a, 25b, and third retardation plate 22 and second polarizer 20 are disposed on the backlight side of second retardation plate 23.

According to the present invention, the portion of the liquid crystal display device other than backlight 28 is referred to as a liquid crystal panel.

The retardation of first retardation plate 24 with respect to light from the direction of the normal to the film plane is defined as Re1(0). The retardation of first retardation plate 24 with respect to light as it is applied from the air to first retardation plate 24 at an angle of 40 degrees from the direction normal to the film plane toward the slow axis is defined as Re1$x$(40). The retardation of first retardation plate 24 with respect to light as it is applied from the air to first retardation plate 24 at an angle of 40 degrees from the direction of the normal to the film plane toward an in-plane direction perpendicular slow axis is defined as Re1$y$(40).

Similarly, the retardation of second retardation plate 23 with respect to light from the direction normal to the film plane is defined as Re2(0). The retardation of second retardation plate 23 with respect to light as it is applied from the air to second retardation plate 23 at an angle of 40 degrees from the direction normal to the film plane toward the slow axis is defined as Re2$x$(40). The retardation of second retardation plate 23 with respect to light as it is applied from the air to second retardation plate 23 at an angle of 40 degrees from the direction normal to the film plane toward an in-plane direction perpendicular slow axis is defined as Re2$y$(40).

Similarly, the retardation of third retardation plate 22 with respect to light from the direction of the normal to the film plane is defined as Re3(0). The retardation of third retardation plate 22 with respect to light as it is applied from the air to third retardation plate 22 at an angle of 40 degrees from the direction normal to the film plane toward the slow axis is defined as Re3$x$(40). The retardation of third retardation plate 22 with respect to light as it is applied from the air to third retardation plate 22 at an angle of 40 degrees from the direction normal to the film plane toward an in-plane direction perpendicular slow axis is defined as Re3$y$(40).

The transmission axis of first polarizer 21 and the transmission axis of second polarizer 20 are approximately perpendicular to each other, and the slow axis of first retardation plate 24 and the slow axis of third retardation plate 22 are approximately perpendicular to each other. Re1(0) and Re3(0) are approximately equal to each other, and Re1(0), Re1$x$(40), Re1$y$(40), Re3(0), Re3$x$(0), and Re3$y$(40) are approximately equal to each other.

The retardation of horizontally oriented liquid crystal layer 25a in the transmissive display area with respect to the normal direction is defined as ReLC(0). The retardation of liquid crystal layer 25a with respect to light as it is applied from air to liquid crystal layer 25a at an angle of 40 degrees from the direction normal toward the direction of the orientation axis of liquid crystal layer 25a is defined as ReLC$x$(40). The retardation of liquid crystal layer 25a with respect to light as it is applied from air to liquid crystal layer 25a at an angle of 40 degrees from the direction normal toward an in-plane direction perpendicular to the orientation axis of liquid crystal layer 25a is defined as ReLC$y$(40).

The slow axis of second retardation plate 23 and the orientation axis of liquid crystal layer 25a in the transmissive display area are approximately perpendicular to each other. Re2(0) and ReLC(0) are approximately equal to each other, Re2$x$(40) and ReLC$y$(40) are approximately equal to each other, and Re2$y$(40) and ReLC$x$(40) are approximately equal to each other.

In the transmissive display area, the retardation and the oblique-view retardation cancel out each other between first retardation plate 24 and third retardation plate 22, and also between second retardation plate 23 and liquid crystal layer 25a in the transmissive display area when black is displayed.

In the reflective display area, first polarizer 21, first retardation plate 24, and liquid crystal layer 25b in the reflective display area when black is displayed jointly make up a circular polarizer.

Operation of the liquid crystal display device according to the present exemplary embodiment, i.e., light modulating operation of the liquid crystal display device according to the present exemplary embodiment, will be described below with reference to FIG. 2B.

In the reflective display area, when no voltage is applied to liquid crystal layer 25b, first polarizer 21, first retardation area 24, and liquid crystal layer 25b in the reflective display area jointly make up a circular polarizer. External light applied from first polarizer 21 is converted into right-handed circularly polarized light which is applied to reflector 26.

Figure 1:
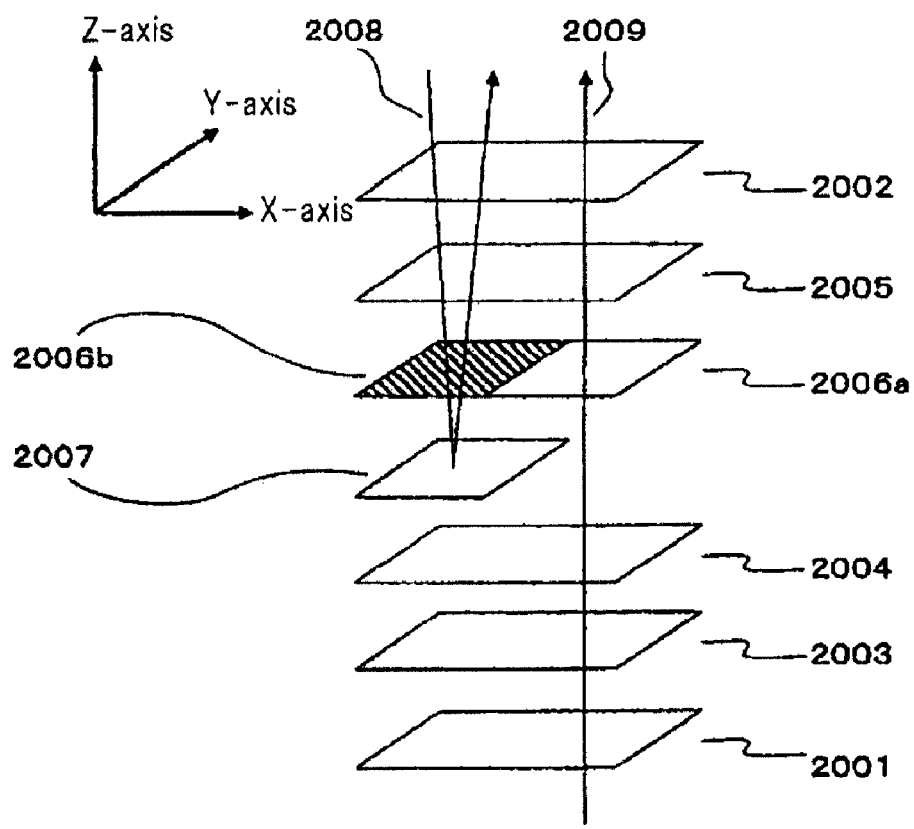
FIG. 1 is a schematic perspective view of a lateral-electric-field semitransmissive liquid crystal display device which is relevant to the present invention.

External light is converted into right-handed or left-handed circularly polarized light depending on the disposition angles of retardation plate 24 and liquid crystal layer 25b. The light applied to reflector 26 is converted into left-handed circularly polarized light when it is reflected by reflector 26, and applied to the circular polarizer provided by liquid crystal layer 25b in the reflective display area, first retardation plate 24, and first polarizer 21. However, the circular polarizer absorbs the left-handed circularly polarized light though it passes right-handed circularly polarized light. Accordingly, no light is emitted from the circular polarizer, but black is displayed in the reflective display area. When no voltage is applied to liquid crystal layer 25b, therefore, the reflective display area displays black. Furthermore, since $Re1(0)$, $Re1x(40)$, and $Re1y(40)$ are approximately equal to each other, first retardation plate 24 functions as a retardation element whose retardation is close to $Re1(0)$ in a wide angular range also with respect to light inclined from the normal direction. Consequently, as the range and extent to which the stacked assembly deviates from the circular polarizer, with respect to the inclined light, are smaller than if a retardation plate whose $Re1(0)$, $Re1x(40)$, and $Re1y(40)$ are not equal to each other is employed, the viewing angle characteristics of the reflective display area are better than those of the liquid crystal display device shown in FIG. 1.

Optical operation of the transmissive display area with no voltage being applied to liquid crystal layer 25a in transmissive display area will be described below. The slow axis of second retardation plate 23 and the orientation axis of liquid crystal layer 25a in the transmissive display area are approximately perpendicular to each other, and the retardation of second retardation plate 23 and the retardation of liquid crystal layer 25a in the transmissive display area are approximately equal to each other. Therefore, the stacked assembly of second retardation plate 23 and liquid crystal layer 25a cancels out their retardations, and is optically isotropic with respect to light parallel to the Z-axis. Furthermore, since $Re2x(40)$ are $ReLCy(40)$ are approximately equal to each other and $Re2y(40)$ and $ReLCx(40)$ are approximately equal to each other, the stacked assembly of second retardation plate 23 and liquid crystal layer 25a cancels out their oblique-view retardations between second retardation plate 23 and liquid crystal layer 25a, and is nearly optically isotropic with respect to oblique light. Inasmuch as the stacked assembly of liquid crystal layer 25a and second retardation plate 23 is isotropic or nearly isotropic, the stacked assembly of first retardation plate 24, liquid crystal layer 25a in the transmissive display area, second retardation plate 23, and third retardation plate 22 can be regarded as the stacked assembly of first retardation plate 24 and third retardation plate 22.

Moreover, the slow axis of first retardation plate 24 and the slow axis of third retardation plate 22 are approximately equal to each other, and the retardation of first retardation plate 24 and the retardation of third retardation plate 22 are approximately perpendicular to each other. Accordingly, the stacked assembly of first retardation plate 24 and third retardation plate 22 is optically isotropic with respect to light parallel to the Z-axis. Furthermore, since $Re1x(40)$, $Re1y(40)$, $Re3x(40)$, $Re3y(40)$ are essentially equal to each other, the retardations with respect to light inclined to the direction normal cancel out each other, thereby making the stacked assembly nearly isotropic. Accordingly, the stacked assembly of first retardation plate 24, liquid crystal layer 25a in the transmissive display area, second retardation plate 23, and third retardation plate 22 is isotropic with respect to light applied from the direction normal and is nearly isotropic with respect to inclined light.

Because the transmission axis of first polarizer 21 and the transmission axis of second polarizer 20 are approximately perpendicular to each other, transmissive display light from backlight 28 is not emitted from first polarizer 21, so that the transmissive display area displays black. Consequently, when no voltage is applied to liquid crystal layer 25a, the transmissive display area displays black as is the case with the reflective display area. Since the stacked assembly of first retardation plate 24, liquid crystal layer 25a, second retardation plate 23, and third retardation plate 22 is nearly isotropic, the viewing angle characteristics of the transmissive display area are substantially equivalent to those of the liquid crystal display device shown in FIG. 1.

Optical operation of the liquid crystal display device when a voltage is applied to liquid crystal layers 25a, 25b will be described below. When a voltage is applied to liquid crystal layers 25a, 25b, liquid crystal layers 25a, 25b in the reflective display area and the transmissive display area are orientationally deformed, with their refractive index anisotropy being changed. In the reflective display area, first polarizer 21, first retardation plate 24, and liquid crystal layer 25b upon black display jointly make up a circular polarizer. Since the refractive index anisotropy of liquid crystal layer 25b is changed by the voltage, the applied light changes from the circularly polarized state. Though the change differs depending on the applied voltage and the thickness of liquid crystal layer 25b, it is possible to set the applied voltage and the thickness of liquid crystal layer 25b so that external light applied from first polarizer 21 is reflected by reflector 26 and passes through first polarizer 21. Therefore, when a voltage is applied to liquid crystal layer 25b, the reflective display area displays white.

Optical operation of the transmissive display area when a voltage is applied to liquid crystal layer 25a will be described below. When the refractive index anisotropy of liquid crystal layer 25a is changed by an applied voltage, the region between second retardation plate 23 and liquid crystal layer 25a is no longer optically isotropic. Therefore, the four layers of third retardation plate 22, second retardation plate 23, liquid crystal layer 25a, and first retardation plate 24 are not optically isotropic, allowing transmission display light from backlight 28 to pass through first polarizer 21 to display white.

In this manner, the liquid crystal display device operates as a normally black semitransmissive liquid crystal display device wherein both the transmissive display area and the reflective display area are energized in the lateral electric field mode.

As described above, in the liquid crystal display device according to the present exemplary embodiment, $Re1(0)$ and $Re3(0)$ of first retardation plate 24 and third retardation plate 22 are approximately equal to each other, and $Re1x(40)$, $Re1y(40)$, $Re3(0)$, $Re3x(40)$, $Re3y(40)$ thereof are approximately equal to each other. Therefore, first retardation plate 24 and third retardation plate 22 may comprise identical retardation plates, and hence the liquid crystal display device is inexpensive to manufacture because the number of the types of retardation plates is reduced. Furthermore, as first retardation plate 24 and third retardation plate 22 comprise identical retardation plates, the contrast ratio of the transmissive display is prevented from suffering a reduction which would otherwise result from different refractive index wavelength dispersions of first retardation plate 24 and third retardation plate 22. According to the present exemplary embodiment, it is possible for first retardation plate 24 and third retardation plate 22 to comprise identical retardation plates at all times regardless of the retardation of liquid crystal layer 25a in the transmissive display area.

In the liquid crystal display device according to the present exemplary embodiment, first polarizer 21, first retardation plate 24, and liquid crystal layer 25b in the reflective display area should preferably jointly make up a wide-range circular polarizer. The wide-range circular polarizer thus provided in the reflective display area is effective to increase the contrast ratio of the reflective display.

Furthermore, the liquid crystal display device according to the present exemplary embodiment may be arranged such that second polarizer 20 is used as a display surface. In this case, second polarizer 20, third retardation plate 22, second retardation plate 23, and liquid crystal layer 25b in the reflective display area make up a wide-range circular polarizer. The wide-range circular polarizer thus provided in the reflective display area is effective to increase the contrast ratio of the reflective display. According to this modification, reflector 26 and backlight 28 shown in FIG. 2B are positionally displaced from the backlight-side substrate to the observer-side substrate.

In the liquid crystal display device according to the present exemplary embodiment, reflector 26 serves simply as a mirror surface. The reflecting surface of reflector 26 may include small surface irregularities. The reflective properties of reflector 26 with respect to external light applied thereto can be adjusted by changing the surface irregularities of reflector 26.

The present exemplary embodiment is also applicable to similar liquid crystal display devices such as FFS (Fringe Field Switching) liquid crystal display devices and AFFS (Advanced Fringe Field Switching) liquid crystal display devices which have electrodes in slightly different structures and layouts.

The liquid crystal display device according to the present exemplary embodiment has been described on the assumption that the liquid crystal molecules have a positive dielectric constant anisotropy. However, the liquid crystal display device according to the present exemplary embodiment may incorporate liquid crystal molecules that have a negative dielectric constant anisotropy.

In the present exemplary embodiment, the liquid crystal layer in the reflective display area is energized in the lateral electric field mode. However, the liquid crystal layer in the reflective display area may be energized in the vertical electric field mode.

STRUCTURAL EXAMPLES

Structural examples of the liquid crystal display devices according to the present exemplary embodiment will be described below. According to the structural examples described below, in the reflective display area, a polarizer, a half-wavelength plate in which Nz=0.5, and a liquid crystal layer in the reflective display area which comprises a quarter-wavelength plate jointly make up a wide-range circular polarizer.

Figure 3:
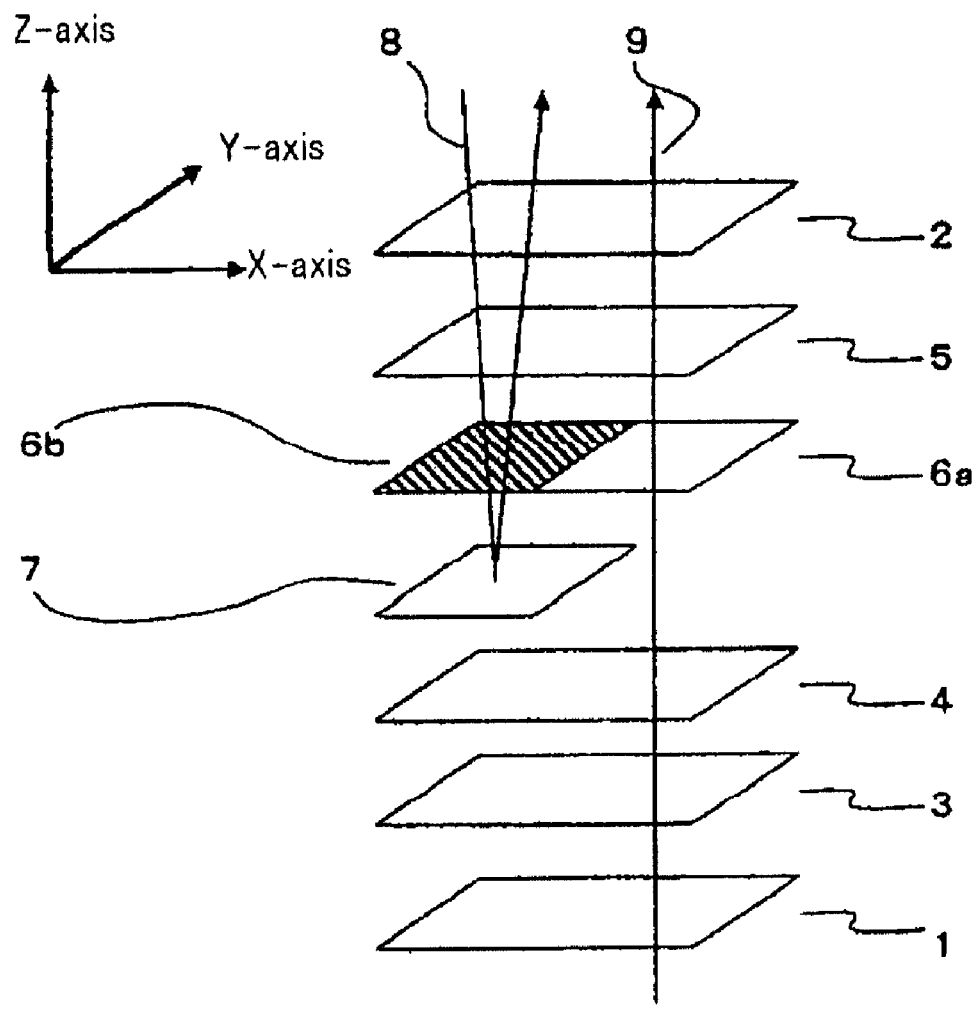
FIG. 3 is a schematic cross-sectional view of a liquid crystal display device and an optical film according to structural example 1.

FIG. 3 shows in schematic cross section of a liquid crystal display device and an optical film according to structural example 1.

As shown in FIG. 3, the liquid crystal display device according to structural example 1 includes a polarizer, retardation plates, liquid crystal layers, and a reflector. The liquid crystal layers comprise two liquid crystal layers in a transmissive display area and a reflective display area including the reflector. The transmissive display area of the liquid crystal display device as viewed from the display surface comprises polarizer 2, half-wavelength plate 5 in which Nz=0.5, liquid crystal layer 6a, half-wavelength plate 4 in which Nz=0, half-wavelength plate 3 in which Nz=0.5, and polarizer 1 which are successively arranged in the order named. The reflective display area of the liquid crystal display device as viewed from the display surface comprises polarizer 2, half-wavelength plate 5 in which Nz=0.5, liquid crystal layer 6b, and reflector 7 which are successively arranged in the order named.

Table 1 shows the components of the transmissive display area of the liquid crystal display device according to structural example 1. The retardation values in Table 1 are at a wavelength of 550 nm. Table 2 shows refractive indexes of the half-wavelength plate in which Nz=0.5.

TABLE 1

| | Nz coefficient | Retardation (nm) | Disposition angle (degrees) |
|---|---|---|---|
| Polarizer 2 | — | — | 90.0 |
| ½-wavelength plate 5 in which Nz = 0.5 | 0.5 | 275.0 | 100.0 |
| Liquid crystal layer 6a | 1.0 | 274.8 | 155.0 |
| ½-wavelength plate 4 in which Nz = 0 | 0 | 275.0 | 65.0 |
| ½-wavelength plate 3 in which Nz = 0.5 | 0.5 | 275.0 | 10.0 |
| Polarizer 1 | — | — | 0.0 |

(The components of the transmissive display area of the liquid crystal display device according to structural example 1 (the values at the wavelength of 550 nm))

TABLE 2

| Retardation plate | Wavelength (nm) | Nx | Ny | Nz |
|---|---|---|---|---|
| ½-wavelength plate in which Nz = 0.5 | 400 | 1.5887 | 1.5835 | 1.5861 |
| | 500 | 1.5882 | 1.5835 | 1.5858 |
| | 600 | 1.5879 | 1.5835 | 1.5857 |

(Refractive indexes of the half-wavelength plate in which Nz = 0.5)

Liquid crystal layers 6a, 6b in the transmissive display area and the reflective display area are energized in the lateral electric field mode. The electric field has its direction at −75 degrees from the disposition angle of liquid crystal layers 6a, 6b.

Remaining parameters which are necessary to evaluate the viewing angle characteristics, other than those in Table 1, will be described below. Liquid crystal layer 6a in the transmissive display area has a refractive index anisotropy Δn of about 0.076 (at the wavelength of 550 nm) and a thickness of about 3.63 μm, and has such wavelength dependence that the refractive index anisotropy is greater at shorter wavelengths as is the case with general liquid crystals. The horizontally oriented liquid crystal has Nz=1.0. Half-wavelength plate 4 in which Nz=0 has refractive indexes nx, ny fixed to the values when Nz=0.5 based on the refractive indexes of the half-wavelength plate in which Nz=0.5 shown in Table 2, and refractive indexes nz is determined by the equation (1) which match the respective Nz coefficients. The refractive indexes at wavelengths other than 400, 500, 600 nm are in accordance with Cauchy's equation. The wavelength dispersions of the refractive indexes for Nz=0.5 and Nz=0 are regarded as being equal to each other, though they actually tend to differ from each other because the material in which Nz=0.5 and the material in which Nz=0 are different from each other.

The retardations of half-wavelength plates 3, 5 in which Nz=0.5 include Re1(0)=Re3(0)=275.0 nm, Re1x(40)=Re3x (40)=276.0 nm, and Re1y(40)=Re3y(40)=276.1 nm. The retardations of half-wavelength plate 4 in which Nz=0 include Re2(0) 275.0 nm, Re2x(40)=300.7 nm, and Re2y(40)=251.5 nm. The retardations of liquid crystal layer 6a include ReLC(0)=274.8 nm, ReLCx(40)=245.0 nm, and ReLCy(40)=303.8 nm.

The display of black on the transmissive display area of the liquid crystal display device according to structural example 1 will be described below. The stacked assembly of liquid crystal area 6a in the transmissive display area and half-wavelength plate 4 in which Nz=0 has its orientation axis and slow axis extending approximately perpendicularly to each other and has Re2(0)=275.0 nm and ReLC(0)=274.8 nm that are substantially equal to each other. With respect to light applied from the direction normal to liquid crystal layer 6a and half-wavelength plate 4 in which Nz=0, the retardations at 275.0 nm and 274.8 nm cancel each other out, and the stacked assembly is optically isotropic.

Since Re2x(40)=300.7 nm and ReLCy(40)=303.8 nm are substantially equal to each other and Re2y(40)=251.5 nm and ReLCx(40)=245.0 nm are substantially equal to each other, the retardations at 300.7 nm and 303.8 nm cancel each other out with respect to light inclined toward the direction of the disposition angle of 65 degrees (245 degrees), and the retardations at 251.5 nm and 245.0 nm cancel each other out with respect to light inclined toward the direction of the disposition angle of 155 degrees (335 degrees). Similarly, the retardations cancel out each other with respect to light inclined to the direction of disposition angles between the disposition angle of 65 degrees (245 degrees) and the disposition angle of 155 degrees (335 degrees).

Because the stacked assembly of liquid crystal layer 6a and half-wavelength plate 4 in which Nz=0 is isotropic, the stacked assembly of half-wavelength plate 5 in which Nz=0.5, liquid crystal layer 6a, half-wavelength plate 4 in which Nz=0, and half-wavelength plate 3 in which Nz=0.5 can be regarded as the stacked assembly of half-wavelength plate 5 in which Nz=0.5 and half-wavelength plate 3 in which Nz=0.5. Since the slow axes of half-wavelength plate 5 in which Nz=0.5 and half-wavelength plate 3 in which Nz=0.5 are substantially perpendicular to each other and have the same retardations Re1(0)=Re3(0)=275.0 nm, the retardations Re1(0), Re3(0) cancel each other out with respect to light applied from the normal direction, and the stacked assembly of half-wavelength plate 5 in which Nz=0.5 and half-wavelength plate 3 in which Nz=0.5 is optically isotropic.

Since Re1x(40)=Re3x(40)=276.0 nm and Re1y(40)=Re3y(40)=276.1 nm, the retardations at 276.0 nm and 276.1 nm cancel each other out with respect to light inclined to the direction of the disposition angle of 100 degrees (280 degrees), and the retardations at 276.1 nm and 276.0 nm cancel each other out with respect to light inclined to the direction of the disposition angle of 10 degrees (190 degrees). Therefore, the retardations with respect to light inclined from the normal direction cancel each other out, making the stacked assembly nearly isotropic.

Consequently, the stacked assembly of half-wavelength plate 5 in which Nz=0.5, liquid crystal layer 6a, half-wavelength plate 4 in which Nz=0, and half-wavelength plate 3 in which Nz=0.5 is isotropic with respect to light applied from the normal direction and is nearly isotropic with respect to inclined light. As a result, the viewing angle characteristics of the transmissive display area for displaying black are substantially equal to the viewing angle characteristics of the liquid crystal display device shown in FIG. 1.

Figure 4:
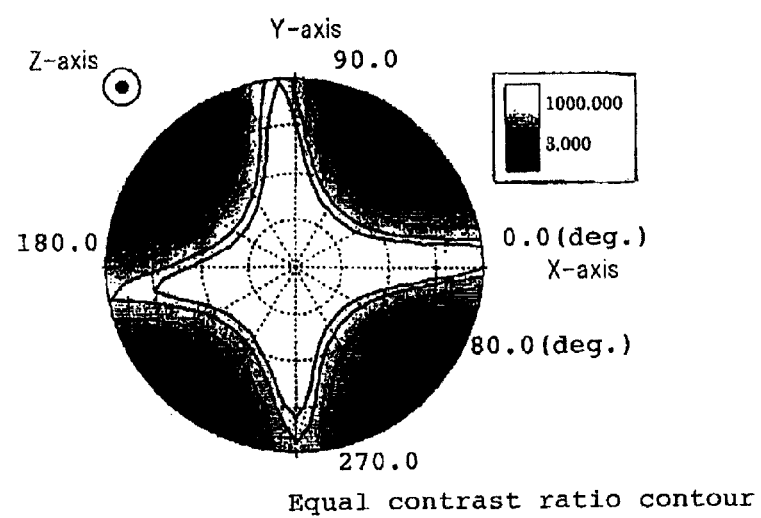
FIG. 4 is an equal contrast ratio diagram showing the evaluated result of viewing angle characteristics of a transmissive display area of the liquid crystal display device according to structural example 1.

FIG. 4 is an equal contrast ratio diagram showing the evaluated result of the viewing angle characteristics of the transmissive display area of the liquid crystal display device according to structural example 1. The equal contrast ratio diagram of the viewing angle characteristics was plotted by dividing the luminance of a white display, produced by applying a voltage until a maximum luminance level is achieved to move the liquid crystal, by the luminance of a black display produced by the liquid crystal kept in its initial state. Contrast ratios 3 through 3000 are displayed, indicating that the contrast ratio is higher as the display is whiter. Equal contrast ratio curves at contrast ratios of 300, 200, 100, 50 and 10 are illustrated successively from within the diagram in the order named. X-, Y-, and Z-axes shown in FIG. 4 are defined in the same fashion as the axes of the coordinates shown in FIG. 2. The four concentric circles represent contrast ratio levels for inclinations at respective angles of 20, 40, 60, 80 degrees (polar angles) from the Z-axis.

Since half-wavelength plate 3 in which Nz=0.5 and half-wavelength plate 5 in which Nz=0.5, which are paired, have the same refractive index wavelength dispersion, the contrast ratio of the transmissive display is high.

Table 3 shows the components of the reflective display area of the liquid crystal display device according to structural example 1.

TABLE 3

| | Nz coefficient | Retardation (nm) | Disposition angle (degrees) |
|---|---|---|---|
| Polarizer 2 | — | — | 90.0 |
| ½-wavelength plate 5 in which Nz = 0.5 | 0.5 | 275.0 | 100.0 |
| Liquid crystal layer 6b | 1.0 | 137.4 | 155.0 |

(the components of the reflective display area of the liquid crystal display device according to structural example 1 (the values at the wavelength of 550 nm))

As shown in FIG. 3, the reflective display area of the liquid crystal display device according to structural example 1 as viewed from the display surface comprises polarizer 2, half-wavelength plate 5 in which Nz=0.5, liquid crystal layer 6b, and reflector 7 which are successively arranged in the order named. Polarizer 2, retardation plate 5, and liquid crystal layer 6b jointly make up a circular polarizer. The circular polarizer should preferably be a wide-range circular polarizer for increasing the contrast ratio of the reflective display. The retardation values in Table 3 are at a wavelength of 550 nm. The refractive indexes of the components are of the same values as those of the transmissive display area of the liquid crystal display device according to structural example 1. Liquid crystal layer 6b in the reflective display area has a thickness of about 1.8 μm, and reflector 7 has mirror-surface reflecting properties.

The display of black on the reflective display area will be described below. Polarizer 2, half-wavelength plate 5 in which Nz=0.5, and liquid crystal layer 6b jointly make up a wide-range circular polarizer with respect to light applied from the direction of the normal. Since Re1(0)=275 nm, Re1x(40)=276.0 nm, Re1y(40)=276.1 nm, and Re1(0), Re1x(40), and Re1y(40) are substantially equal to each other, the first retardation plate (half-wavelength plate 5 in which Nz=0.5) functions as a retardation element whose retardation is close to Re1(0) in a wide angular range with respect to light inclined from the normal direction. Consequently, as the range and extent to which the stacked assembly deviates from the wide-angle circular polarizer with respect to the inclined light are smaller than if a retardation plate, whose Re1(0), Re1x(40), and Re1y(40) are not equal to each other, is employed, the viewing angle characteristics of the reflective display area for displaying black are better than the liquid crystal display device shown in FIG. 1.

Figure 5:
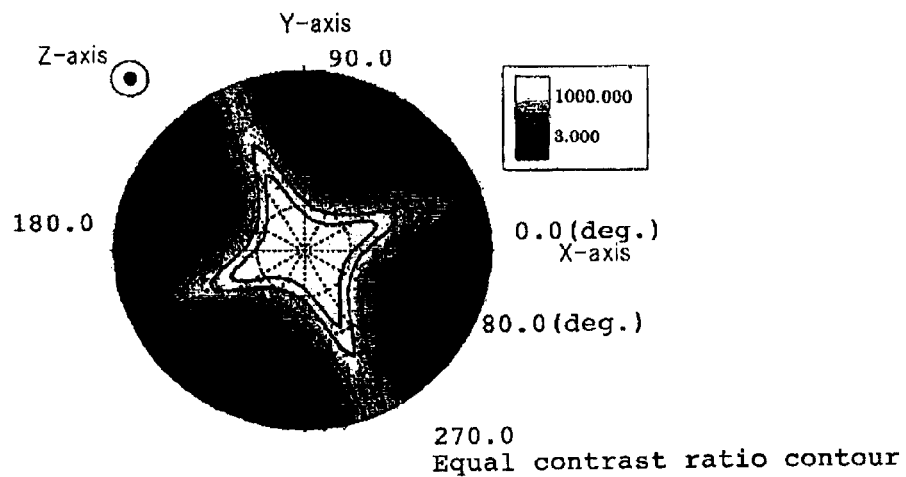
FIG. 5 is an equal contrast ratio diagram showing the evaluated result of viewing angle characteristics of a reflective display area of the liquid crystal display device according to structural example 1.

FIG. 5 is an equal contrast ratio diagram showing the evaluated result of the viewing angle characteristics of the reflective display area of the liquid crystal display device according to structural example 1. As with FIG. 4, contrast ratios 3 through 3000 are displayed, indicating that the contrast ratio becomes higher as the display becomes whiter. Equal contrast ratio curves at contrast ratios of 200, 100, 50 and 10 are illustrated successively from within the diagram in the order named. X-, Y-, and Z-axes shown in FIG. 5 are defined in the same fashion as the axes of the coordinates shown in FIG. 2.

Though the retardation of liquid crystal layer 6a in the transmissive display area is about one half of the wavelength in structural example 1, it may be changed by designing. If the retardation of the liquid crystal layer is changed, then the retardation of the second retardation plate is changed as well.

With respect to half-wavelength plate 5 in which Nz=0.5, liquid crystal layer 6a, half-wavelength plate 4 in which Nz=0, and half-wavelength plate 3 in which Nz=0.5 in structural example 1, the effects that misalignments of the slow axis and the orientation axis, retardation shifts, and Nz coefficient shifts have on the display were estimated. Specifically, the effects that misalignments of the slow axis and the orientation axis, and retardation shifts have on the front contrast ratio were evaluated, and the effects that Nz coefficient shifts have on the contrast ratio at a polar angle of 60 degrees were evaluated. All the effects of those misalignments and shifts were independently evaluated. Retardation shifts were evaluated as thickness changes of the retardation plates and the liquid crystal layers. Refractive indexes nx, ny of the half-wavelength plate other than those in which Nz=0.5 were fixed to the values when Nz=0.5 based on the refractive indexes of the half-wavelength plate in which Nz=0.5 shown in Table 2, and refractive indexes nz were determined by the equation (1) which match the respective Nz coefficients.

Figure 6:
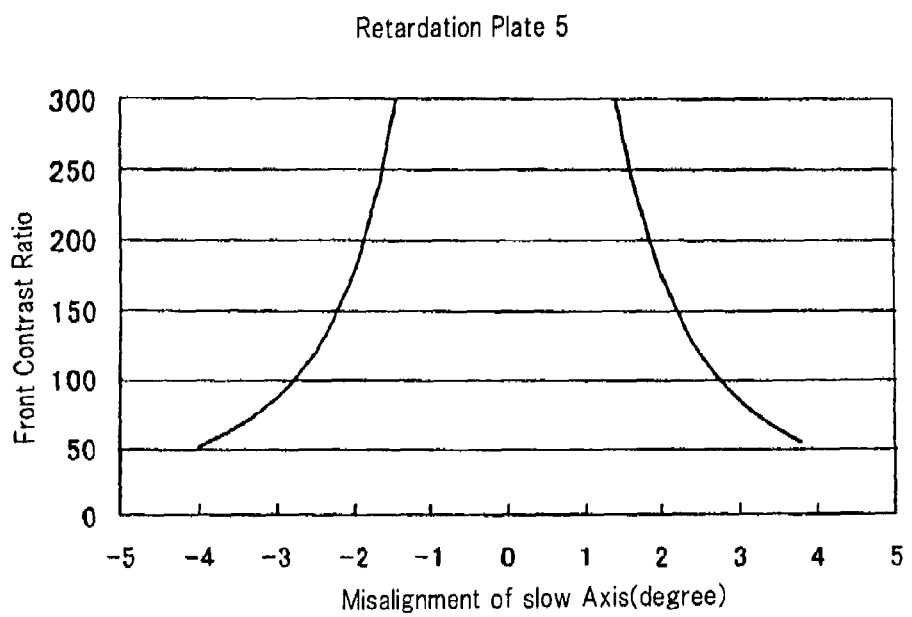
FIG. 6 is a diagram showing the relationship between the misalignment of the slow axis of half-wavelength plate 5 in which Nz=0.5 and the front contrast ratio on transmissive display.
Figure 7:
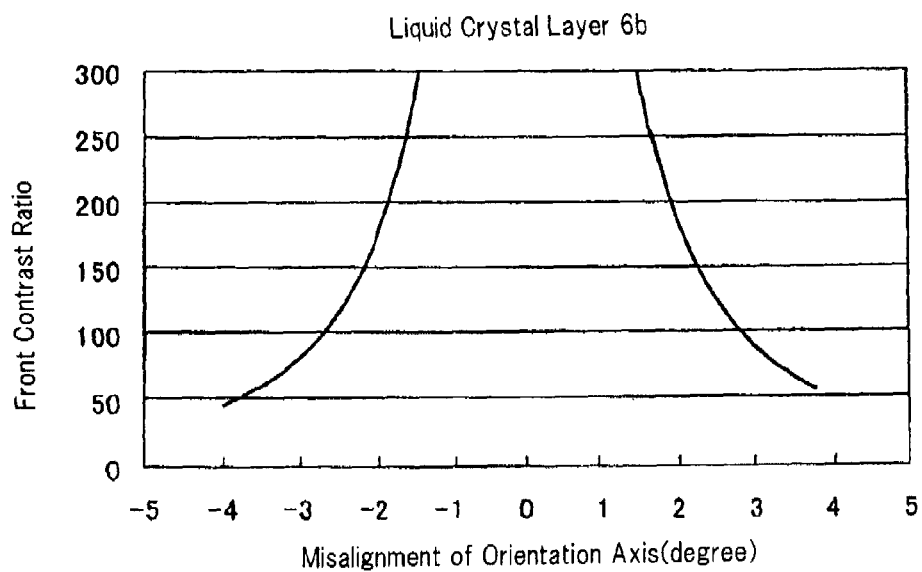
FIG. 7 is a diagram showing the relationship between the misalignment of the orientation axis of liquid crystal layer 6a and the front contrast ratio on transmissive display.
Figure 8:
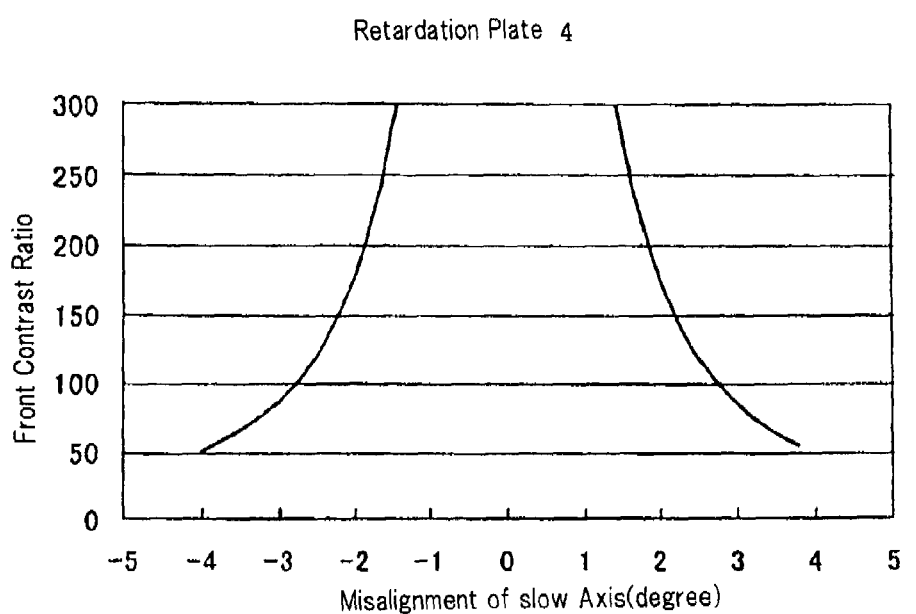
FIG. 8 is a diagram showing the relationship between the misalignment of the slow axis of half-wavelength plate 4 in which Nz=0 and the front contrast ratio on transmissive display.
Figure 9:
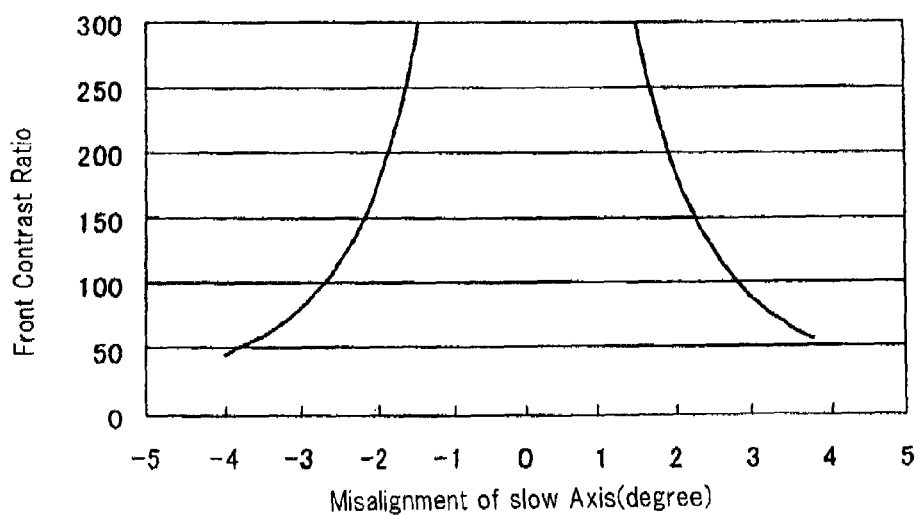
FIG. 9 is a diagram showing the relationship between the misalignment of the slow axis of half-wavelength plate 3 in which Nz=0.5 and the front contrast ratio on transmissive display.

FIG. 6 shows the relationship between the misalignment of the slow axis of half-wavelength plate 5 in which Nz=0.5 and the front contrast ratio on transmissive display. FIG. 7 shows the relationship between the misalignment of the orientation axis of liquid crystal layer 6a and the front contrast ratio on transmissive display. FIG. 8 shows the relationship between the misalignment of the slow axis of half-wavelength plate 4 in which Nz=0 and the front contrast ratio on transmissive display. FIG. 9 shows the relationship between the misalignment of the slow axis of half-wavelength plate 3 in which Nz=0.5 and the front contrast ratio on transmissive display.

As can be seen from FIGS. 6 through 9, when the disposition error with respect to the slow axis of half-wavelength plate 5 in which Nz=0.5 was in the range from −2.8 degrees to 2.6 degrees, the disposition error with respect to the orientation axis of liquid crystal layer 6a was in the range from −2.6 degrees to 2.6 degrees, the disposition error with respect to the slow axis of half-wavelength plate 4 in which Nz=0 was in the range from −2.6 degrees to 2.6 degrees, and the disposition error with respect to the slow axis of half-wavelength plate 3 in which Nz=0.5 was in the range from −2.6 degrees to 2.8 degrees in the liquid crystal display device according to structural example 1, the front contrast ratio of the transmissive display had a value of 100 or greater.

Figure 10:
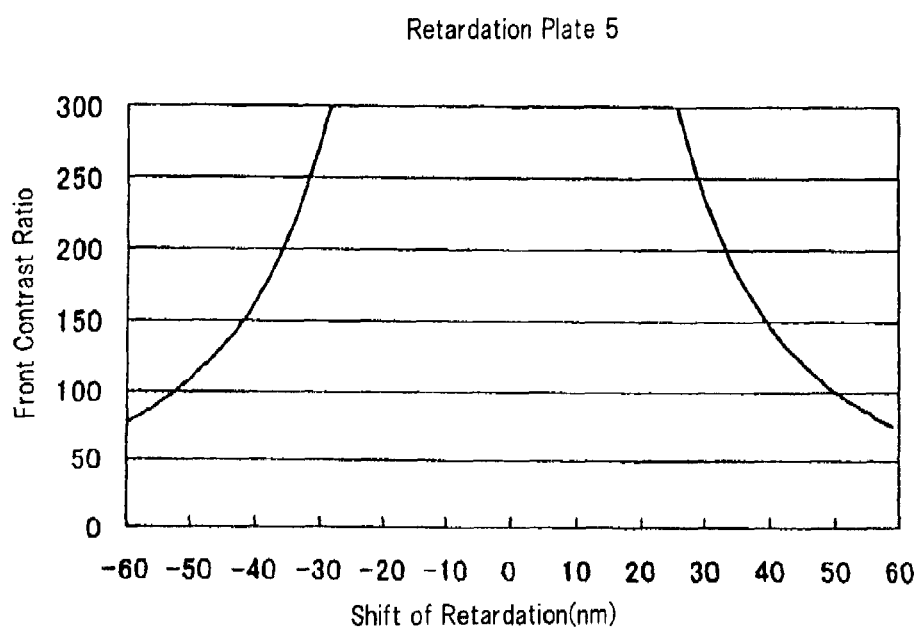
FIG. 10 is a diagram showing the relationship between the shift of the retardation of half-wavelength plate 5 in which Nz=0.5 and the front contrast ratio on transmissive display.
Figure 11:
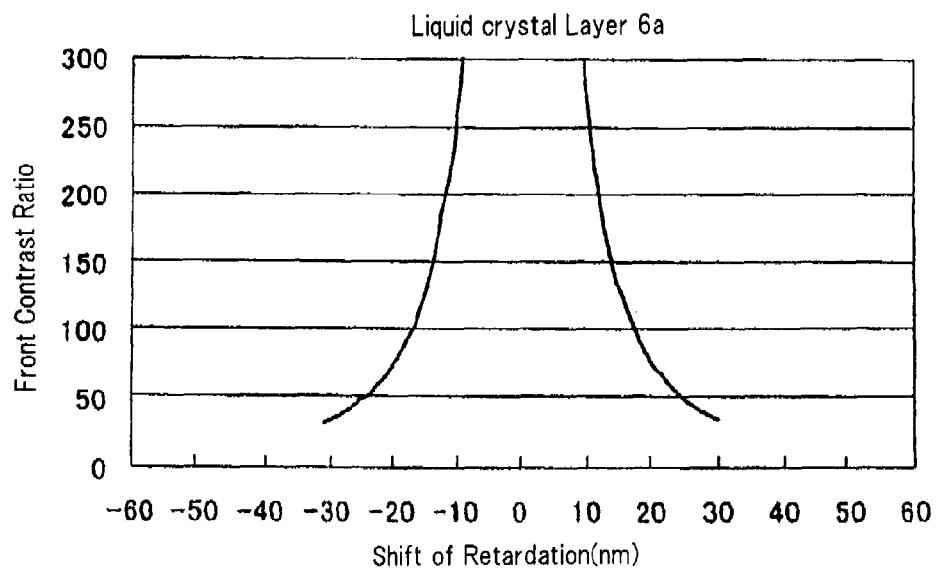
FIG. 11 is a diagram showing the relationship between the shift of the retardation of liquid crystal layer 6a and the front contrast ratio on trans-missive display.
Figure 12:
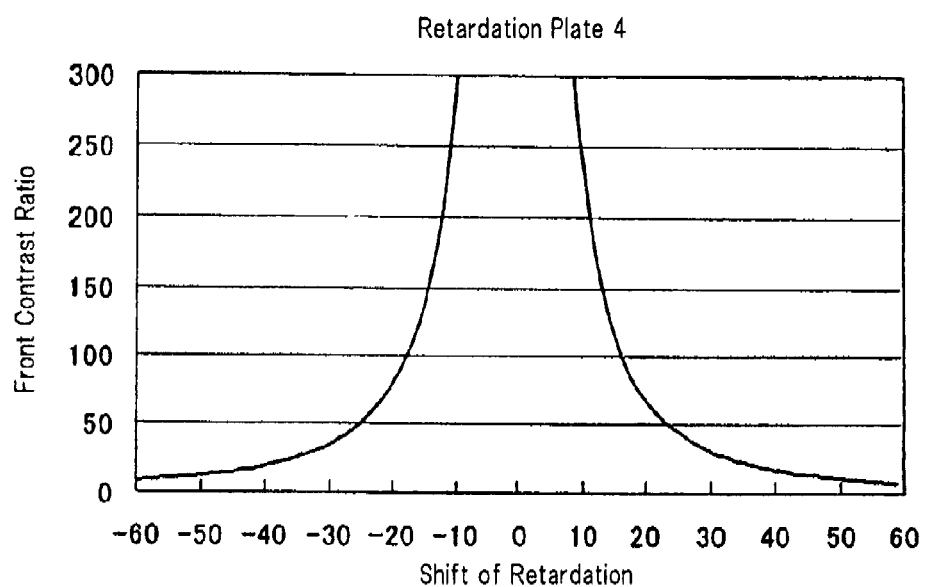
FIG. 12 is a diagram showing the relationship between the shift of the retardation of half-wavelength plate 4 in which Nz=0 and the front contrast ratio on transmissive display.
Figure 13:
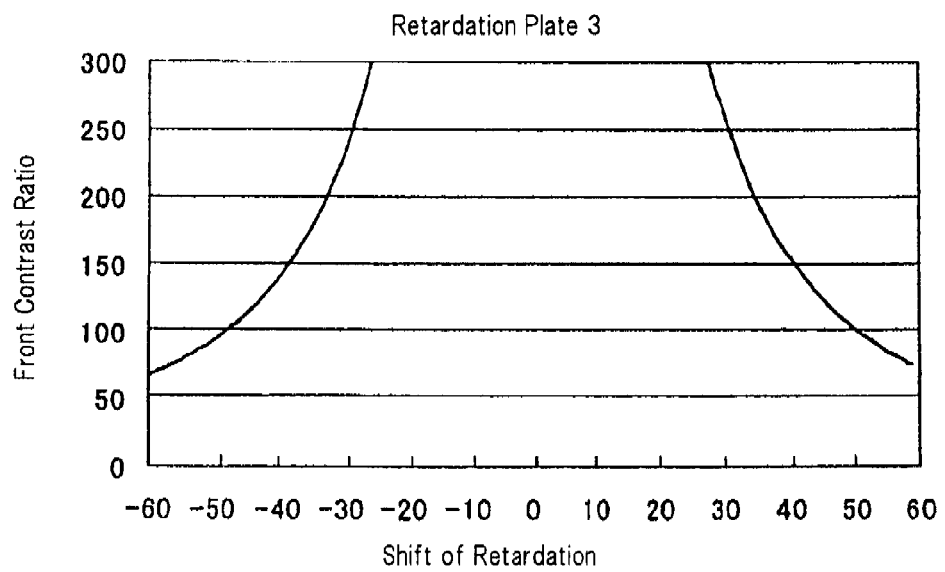
FIG. 13 is a diagram showing the relationship between the shift of the retardation of half-wavelength plate 3 in which Nz=0.5 and the front contrast ratio on transmissive display.

FIG. 10 shows the relationship between the shift of the retardation of half-wavelength plate 5 in which Nz=0.5 and the front contrast ratio on transmissive display. FIG. 11 shows the relationship between the shift of the retardation of liquid crystal layer 6a and the front contrast ratio on transmissive display. FIG. 12 shows the relationship between the shift of the retardation of half-wavelength plate 4 in which Nz=0 and the front contrast ratio on trans-missive display. FIG. 13 shows the relationship between the shift of the retardation of half-wavelength plate 3 in which Nz=0.5 and the front contrast ratio on transmissive display.

As can be seen from FIGS. 10 through 13, when the error of the retardation of half-wavelength plate 5 in which Nz=0.5 was in the range from −51.9 nm to 48.9 nm, the error of the retardation of liquid crystal layer 6a was in the range from −16.1 nm to 17.2 nm, the error of the retardation of half-wavelength plate 4 in which Nz=0 was in the range from −16.8 nm to 15.7 nm, and the error of the retardation of half-wavelength plate 3 in which Nz=0.5 was in the range from −48.0 nm to 49.9 nm, the front contrast ratio of the transmissive display had a value of 100 or greater.

Figure 14:
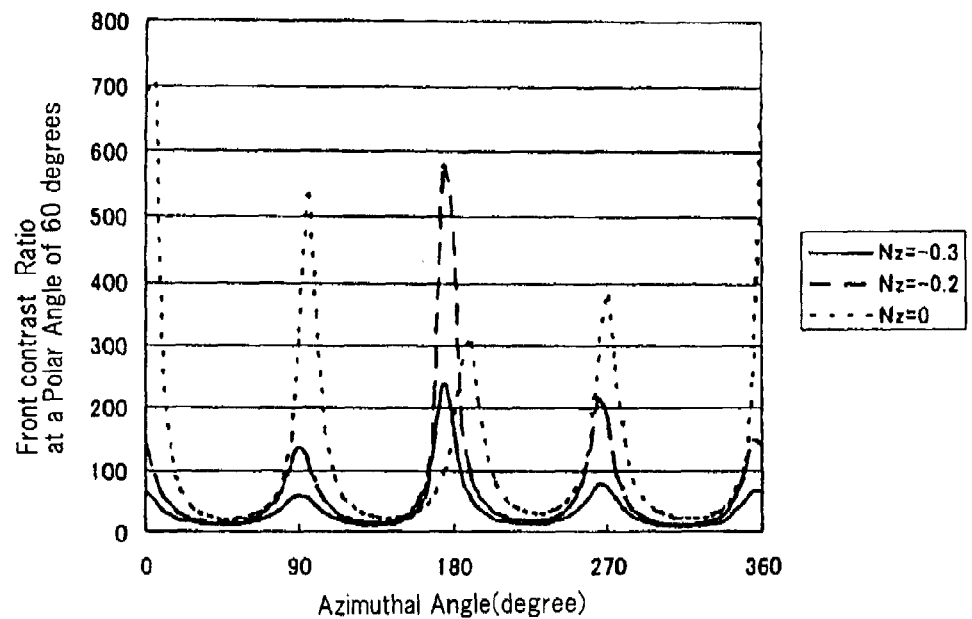
FIG. 14 is a diagram showing the relationship between the azimuthal angle and the front contrast ratio at a polar angle of 60 degrees on transmissive display with respect to Nz coefficients (−0.3, −0.2, 0) of half-wavelength plate 3.
Figure 15:
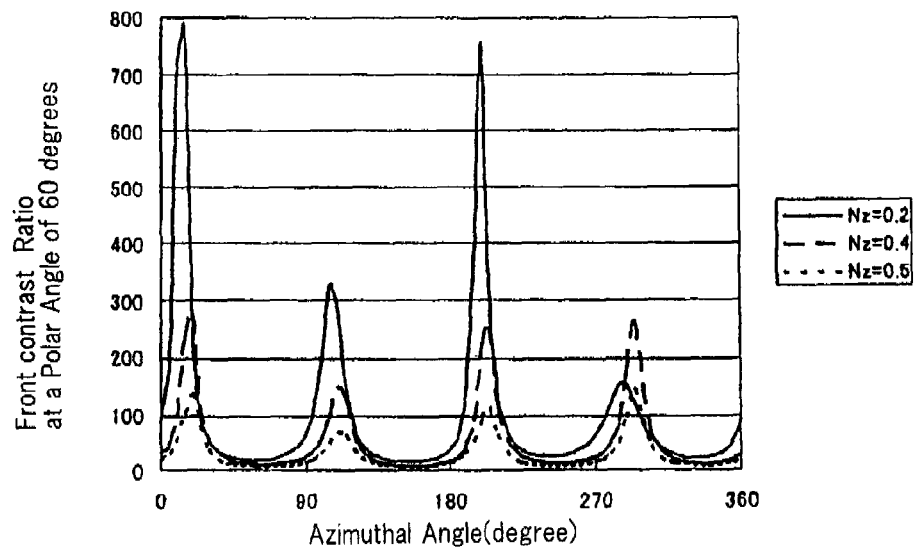
FIG. 15 is a diagram showing the relationship between the azimuthal angle and the front contrast ratio at a polar angle of 60 degrees on transmissive display with respect to Nz coefficients (0.2, 0.4, 0.5) of half-wavelength plate 3.

FIG. 14 shows the relationship between the azimuthal angle and the front contrast ratio at a polar angle of 60 degrees on transmissive display with respect to Nz coefficients (−0.3, −0.2, 0) of half-wavelength plate 3. FIG. 15 shows the relationship between the azimuthal angle and the front contrast ratio at a polar angle of 60 degrees on transmissive display with respect to Nz coefficients (0.2, 0.4, 0.5) of half-wavelength plate 3. In FIGS. 14 and 15, the coordinates are defined in the same manner as in FIG. 3, and the azimuthal angle represents an angle from the +X-axis.

Rex(40) and Rey(40) at the Nz coefficients from −0.3 to 1.0 of the half-wavelength plate are shown in Tables 4 and 5 below.

TABLE 4

| Nz coefficient | −0.3 | −0.2 | 0 | 0.2 | 0.3 | 0.4 |
|---|---|---|---|---|---|---|
| Rex(40) | 315.5 nm | 310.6 nm | 300.7 nm | 290.9 nm | 285.9 nm | 281.0 nm |
| Rey(40) | 236.9 nm | 241.8 nm | 251.5 nm | 261.4 nm | 266.3 nm | 271.2 nm |

(Rex(40) and Rey(40) at the Nz coefficients from −0.3 to 1.0 of the half-wavelength plate)

TABLE 5

| Nz coefficient | 0.5 | 0.6 | 0.8 | 0.9 | 1.0 |
|---|---|---|---|---|---|
| Rex(40) | 276.0 nm | 271.1 nm | 261.1 nm | 256.1 nm | 251.1 nm |
| Rey(40) | 276.1 nm | 281.0 nm | 290.9 nm | 295.8 nm | 300.8 nm |

(Rex(40) and Rey(40) at the Nz coefficients from −0.3 to 1.0 of the half-wavelength plate)

As can be seen from FIGS. 14 and 15, when the Nz coefficient of half-wavelength plate 3 was in the range from −0.2 to 0.4, the contrast ratio had a value of 100 or more at perpendicular azimuthal angles (azimuthal angles of about 0, 90, 180, and 270 degrees) at the polar angle of 60 degrees. It can be seen from Table 4 and 5 that when 281.0 nm≦Re2x(40)≦310.6 nm and ReLCy(40)=303.8 nm, Re2x(40) and ReLCy(40) can be regarded as being approximately equal to each other to achieve the advantages of the present invention. Similarly, when 241.8 nm≦Re2y(40)≦271.2 nm and ReLCx (40)=245.0, Re2y(40) and ReLCx(40) can be regarded as being approximately equal to each other.

Figure 16:
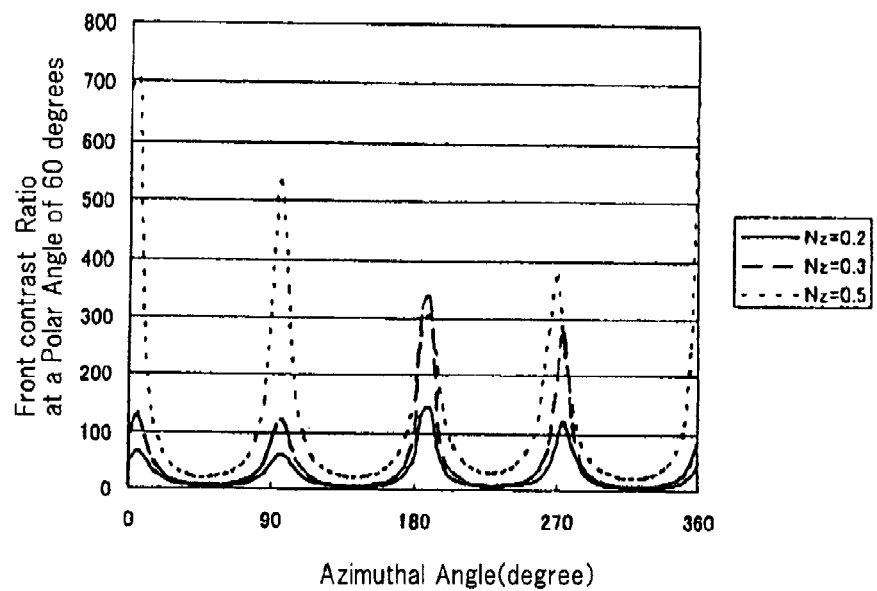
FIG. 16 is a diagram showing the relationship between the azimuthal angle and the front contrast ratio at a polar angle of 60 degrees on transmissive display with respect to Nz coefficients (0.2, 0.3, 0.5) of half-wavelength plate 5 and half-wavelength plate 3 in case the Nz coefficients of half-wavelength plate 5 and half-wavelength plate 3 are equal to each other.
Figure 17:
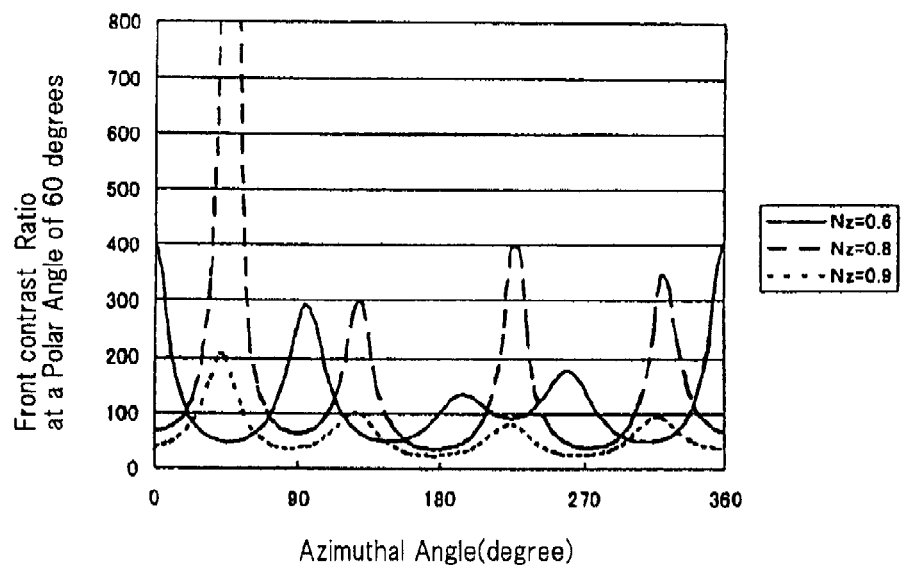
FIG. 17 is a diagram showing the relationship between the azimuthal angle and the front contrast ratio at a polar angle of 60 degrees on transmissive display with respect to Nz coefficients (0.6, 0.8, 0.9) of half-wavelength plate 5 and half-wavelength plate 3 in case the Nz coefficients of half-wavelength plate 5 and half-wavelength plate 3 are equal to each other.

FIG. 16 shows the relationship between the azimuthal angle and the front contrast ratio at a polar angle of 60 degrees on transmissive display with respect to Nz coefficients (0.2, 0.3, 0.5) of half-wavelength plate 5 and half-wavelength plate 3 in cases where the Nz coefficients of half-wavelength plate 5 and half-wavelength plate 3 are equal to each other. FIG. 17 shows the relationship between the azimuthal angle and the front contrast ratio at a polar angle of 60 degrees on transmissive display with respect to Nz coefficients (0.6, 0.8, 0.9) of half-wavelength plate 5 and half-wavelength plate 3 in cases where the Nz coefficients of half-wavelength plate 5 and half-wavelength plate 3 are equal to each other. In FIGS. 16 and 17, the coordinates are defined in the same manner as in FIG. 3.

As can be seen from FIGS. 16 and 17, when the Nz coefficients of half-wavelength plate 5 and half-wavelength plate 3 were equal to each other, and were in the range from 0.3 to 0.8, the contrast ratio had a value of 100 or more at perpendicular azimuthal angles (azimuthal angles of about 0, 90, 180, and 270 degrees) at the polar angle of 60 degrees. Therefore, it can be seen from Table 4 and 5 that when Re1(0)=275.0 nm, 261.1 nm≦Re1x(40)≦285.9 nm, and 266.3 nm≦Re1y(40)≦290.9 nm, Re1(0), Re1x(40), and Re1y(40) can be regarded as being approximately equal to each other to achieve the advantages of the present invention.

Figure 18:
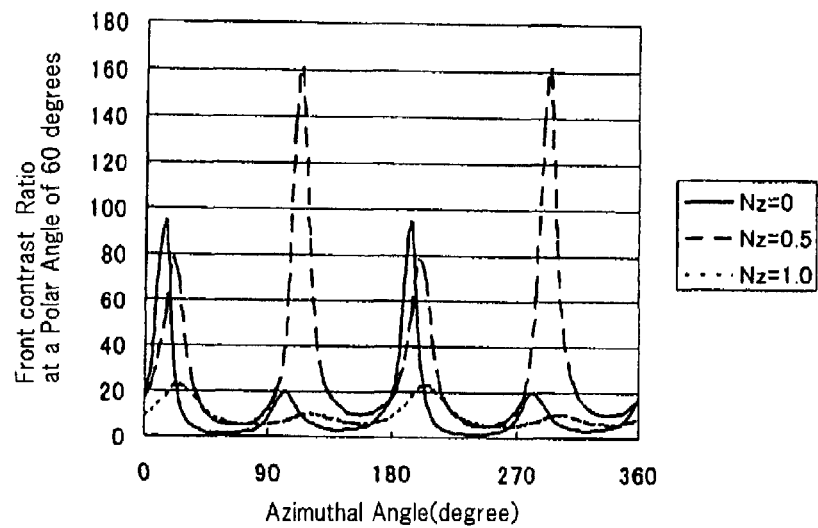
FIG. 18 is a diagram showing the relationship between the azimuthal angle and the front contrast ratio at a polar angle of 60 degrees on reflective display with respect to Nz coefficients (0, 0.5, 1.0) of half-wavelength plate 5.

FIG. 18 shows the relationship between the azimuthal angle and the front contrast ratio at a polar angle of 60 degrees on the reflective display with respect to Nz coefficients (0, 0.5, 1.0) of half-wavelength plate 5. In FIG. 18, the coordinates are defined in the same manner as in FIG. 3.

As can be seen from FIG. 18, when the Nz coefficient of half-wavelength plate 5 is 0.5, the average contrast ratio at the perpendicular azimuthal angles at the polar angle of 60 degrees is greater than when Nz=0 and Nz=1. The average contrast ratio at all the azimuthal angles at the polar angle of 60 degrees is also greater. Therefore, when the Nz coefficient of half-wavelength plate 5 is 0.5, the reflective viewing angle characteristics are better than when Nz=0 and Nz=1. When the Nz coefficient of half-wavelength plate 5 is in the range of 0<Nz<0.5, the liquid crystal display device has viewing angle characteristics between the viewing angle characteristics when Nz=0 and the viewing angle characteristics when Nz=0.5. Similarly, when the Nz coefficient of half-wavelength plate 5 is in the range of 0.5<Nz<1, the liquid crystal display device has viewing angle characteristics between the viewing angle characteristics when Nz=0.5 and the viewing angle characteristics when Nz=1.

A liquid crystal display device according to structural example 2 will be described below. Structural example 2 is different from structural example 1 at the retardation of the first retardation plate and the retardation of the liquid crystal layer and they jointly make up a wide-range circular polarizer. Tables 6 through 8 show the components of the reflective display areas of liquid crystal display devices according to structural examples 2-1 through 2-7.

TABLE 6

| | Structural example 2-1 | | Structural example 2-2 | | Structural example 2-3 | |
|---|---|---|---|---|---|---|
| | Retardation (nm) | Disposition angle (degrees) | Retardation (nm) | Disposition angle (degrees) | Retardation (nm) | Disposition angle (degrees) |
| Polarizer | — | 0 | — | 0 | — | 0 |
| Retardation plate | 300.0 | 167.4 | 250.0 | 74.5 | 220.0 | 344.1 |
| Liquid crystal layer | 140.5 | 113.3 | 125.5 | 16.1 | 111.5 | 106.8 |

(The components of the reflective display area of the liquid crystal display device according to structural example 2 (the values at the wavelength of 550 nm))

TABLE 7

| | Structural example 2-1 | | Structural example 2-2 | | Structural example 2-3 | |
|---|---|---|---|---|---|---|
| | Retardation (nm) | Disposition angle (degrees) | Retardation (nm) | Disposition angle (degrees) | Retardation (nm) | Disposition angle (degrees) |
| Polarizer | — | 0 | — | 0 | — | 0 |
| Retardation plate | 200.0 | 195.8 | 180.0 | 345.0 | 160.0 | 284.5 |
| Liquid crystal layer | 102.9 | 71.6 | 97.0 | 292.0 | 93.1 | 334.4 |

(The components of the reflective display area of the liquid crystal display device according to structural example 2 (the values at the wavelength of 550 nm))

TABLE 8

| | Structural example 2-7 | |
| --- | --- | --- |
| | Retardation (nm) | Disposition angle (degrees) |
| Polarizer | | 0 |
| Retardation plate | 138.5 | 193.4 |
| Liquid crystal layer | 91.5 | 240.2 |

(The components of the reflective display area of the liquid crystal display device according to structural example 2 (the values at the wavelength of 550 nm))

The effects of the wide-range circular polarizers were evaluated in the same manner as with structural example 1. The retardation plates employed the values of the refractive indexes of the half-wavelength plate in which Nz=0 in Table 3, and had thicknesses that were different depending on the retardation. The wide-range performance of the wide-range circular polarizers was evaluated only with respect to light applied from the direction normal to the substrate. Since no Nz coefficients affect the wide-range performance, therefore, the Nz coefficients are omitted in structural examples 2-1 through 2-7.

Figure 19:
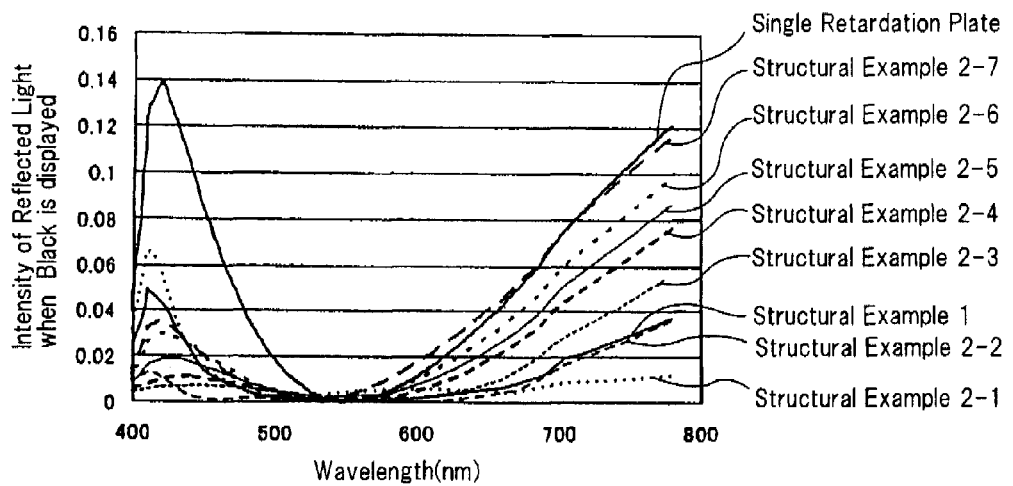
FIG. 19 is a diagram showing the wavelength dependence of the intensity of reflected light when black is displayed in structural example 1 and structural examples 2-1 through 2-7.

The wide-range performance of the wide-range circular polarizer which is made up of the polarizer, the retardation plate, and the liquid crystal layer in the reflective display area can be judged by observing the wavelength dependence of the intensity of reflected light when black is displayed. Because the wide-range performance is better, the intensity of reflected light when black is displayed becomes closer to 0 independently of the wavelength of visible light. FIG. 19 shows the wavelength dependence of the intensity of reflected light when black is displayed in structural example 1 and structural examples 2-1 through 2-7. FIG. 19 also shows the wavelength dependence of the intensity of reflected light of a single retardation plate which comprises a polarizer (with a disposition angle of 0 degree), a quarter-wavelength plate (with a disposition angle of 45 degrees), and a reflector.

As can be seen from FIG. 19, the wavelength dependence of the intensity of reflected light of structural examples 2-2 through 2-6 represents better wide-range performance than the wavelength dependence of the intensity of reflected light of the single retardation plate. The wavelength dependence of the intensity of reflected light of structural example 2-7 is essentially equivalent to the wavelength dependence of the intensity of reflected light of the single retardation plate.

COMPARATIVE STRUCTURAL EXAMPLE

Comparative structural example 1 will be described below. A liquid crystal display device according to comparative structural example 1 is of a structure which is identical to the liquid crystal display device shown in FIG. 1.

Figure 20:
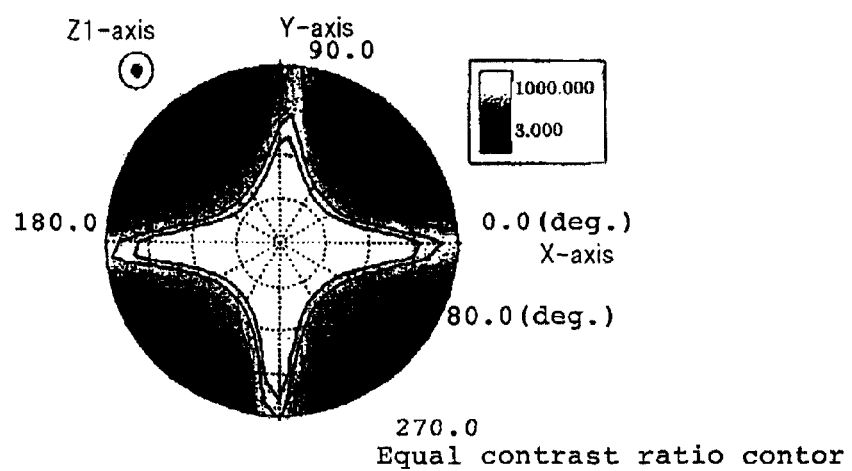
FIG. 20 is an equal contrast ratio diagram showing the evaluated result of viewing angle characteristics of a transmissive display area of a liquid crystal display device according to comparative structural example 1.
Figure 21:
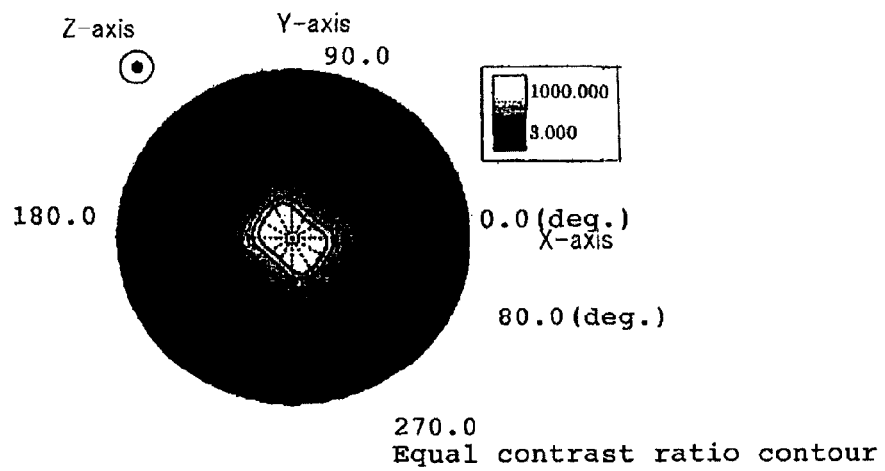
FIG. 21 is an equal contrast ratio diagram showing the evaluated result of viewing angle characteristics of a reflective display area of the liquid crystal display device according to comparative structural example 1.

Tables 9 and 10 show the components of transmissive and reflective display areas of the liquid crystal display device according to comparative structural example 1. FIGS. 20 and 21 are equal contrast ratio diagrams showing the evaluated results of viewing angle characteristics of the transmissive and reflective display areas of the liquid crystal display device according to comparative structural example 1.

TABLE 9

| | Nz coefficient | Retardation (nm) | Disposition angle (degrees) |
| --- | --- | --- | --- |
| Polarizer 2002 | — | — | 90.0 |
| ½-wavelength plate 2005 in which Nz = 1 | 1.0 | 275.0 | 15.0 |
| Liquid crystal layer 2006a | 1.0 | 233.8 | 75.0 |
| ½-wavelength plate 2004 in which Nz = 0 | 0 | 233.0 | 165.0 |
| ½-wavelength plate 2003 in which Nz = 0 | 0 | 275.0 | 105.0 |
| Polarizer 2001 | — | — | 0.0 |

(The components of the transmissive display area of the liquid crystal display device according to comparative structural example 1 (the values at the wavelength of 550 nm))

TABLE 10

| | Nz coefficient | Retardation (nm) | Disposition angle (degrees) |
| --- | --- | --- | --- |
| Polarizer 2002 | — | — | 90.0 |
| ½-wavelength plate 2005 in which Nz = 1 | 1.0 | 275.0 | 15.0 |
| Liquid crystal layer 2006b | 1.0 | 137.4 | 75.0 |

(The components of the reflective display area of the liquid crystal display device according to comparative structural example 1 (the values at the wavelength of 550 nm))

According to the present comparative structural example, half-wavelength plate 2005 in which Nz=1 and half-wavelength plate 2003 in which Nz=0 are regarded as having the same wavelength dispersion. However, since their wavelength dispersions tend to differ from each other because the material of the wavelength plate in which Nz=1 and the material of the wavelength plate in which Nz=0 are different from each other, the front contrast ratio on transmissive display is reduced.

A comparison between the equal contrast ratio diagram (FIG. 4) of structural example 1 for a transmissive display and the equal contrast ratio diagram (FIG. 20) of comparative structural example 1 for a transmissive display indicates that the viewing angle characteristics for a transmissive display are substantially equivalent to each other. On the other hand, a comparison between the equal contrast ratio diagrams (FIGS. 5 and 21) for a reflective display indicates that the viewing angle characteristics of structural example 1 for a reflective display are better than those of comparative structural example 1.

The semitransmissive liquid crystal display devices according to the exemplary embodiment and the structural elements have been described above. However, the present invention is also applicable to transmissive liquid crystal display devices and reflective liquid crystal display devices by replacing the structure of the transmissive display area with the structure of a transmissive liquid crystal display device and by replacing the structure of the reflective display area with the structure of a reflective liquid crystal display device.

The display of black on the transmissive display area of the liquid crystal display device according to the exemplary embodiment will be described below.

Generally, in liquid crystal display devices, substrates sandwiching therebetween a polarizer, retardation plates, and a liquid crystal layer are bonded to each other by an adhesive to prevent reflections from interfaces. The refractive index of the substrates sandwiching therebetween the polarizer, the retardation plates, and the liquid crystal layer in the liquid crystal display devices is often in the range from 1.5 to 1.6. When light inclined from the front direction of the liquid crystal display device is applied to the liquid crystal display device, the difference between angles of the light in the retardation plates and the liquid crystal layer is negligible in the structure according to the present exemplary embodiment. The retardations with respect to the inclined light of the first retardation plate, the second retardation plate, the third retardation plate, and the liquid crystal layers according to the present exemplary embodiment can be evaluated as the retardations with respect to light applied from the air to the first retardation plate, the second retardation plate, the third retardation plate, and the liquid crystal layer.

Since the slow axis of the second retardation plate and the orientation axis of the liquid crystal layers in the transmissive display area are approximately perpendicular to each other and Re2(0) and ReLC(0) are approximately equal to each other, Re2(0) and ReLC(0) cancel each other out with respect to light that is applied to the liquid crystal layers and the second retardation plate from the direction normal to the plane of the liquid crystal layers and the second retardation plate, making the stacked assembly optically isotropic. Furthermore, as Re2$x$(40) and ReLCy(40) are approximately equal to each other, and Re2$y$(40) and ReLCx(40) are approximately equal to each other, the retardations cancel each other out with respect to light that is applied to the liquid crystal layers and the second retardation plate at an angle of 40 degrees from the direction normal to the plane of the liquid crystal layers and the second retardation plate, making the stacked assembly nearly optically isotropic.

According to the present exemplary embodiment, since Re2(0) and ReLC (0) are approximately equal to each other, Re2$x$(40) and ReLCy(40) are approximately equal to each other, and Re2$y$(40) and ReLCx(40) are approximately equal to each other, the retardations cancel each other out between Re2$x$(θ) and ReLCy(θ) and between Re2$y$(θ) and ReLCx(θ) to the extent which is necessary to achieve the advantages of the present invention within the range of θ required by the liquid crystal display device according to the pre-sent exemplary embodiment, with respect to light inclined at the angle of θ to the direction normal to the plane, making the stacked assembly nearly optically isotropic. This holds true not only for the relationship between the liquid crystal layers and the second retardation plate but also for the relationship between the first retardation plate and the third retardation plate.

Inasmuch as the stacked assembly of the liquid crystal layer in the transmissive display area and the second retardation plate is isotropic or nearly isotropic, the stacked assembly of the first retardation plate, the liquid crystal layer in the transmissive display area, the second retardation plate, and the third retardation plate can be regarded as the stacked assembly of the first retardation plate and the third retardation plate. Because the slow axes of the first retardation plate and the third retardation plate are substantially perpendicular to each other and Re1(0) and Re3(0) are approximately equal to each other, Re1(0) and Re3(0) cancel each other out with respect to light applied from the direction of the normal to the plane of the first retardation plate and the third retardation plate, making the stacked assembly of the first retardation plate and the third retardation plate optically isotropic. Furthermore, since Re1$x$(40), Re1$y$(40), Re3$x$(40), and Re3$y$(40) are approximately equal to each other, the retardations cancel each other out with respect to light inclined to the direction of the normal to the plane, making the stacked assembly nearly isotropic. Therefore, the stacked assembly of the first retardation plate, the liquid crystal layer in the transmissive display area, the second retardation plate, and the third retardation plate is isotropic with respect to light applied from the direction normal to the plane, and nearly isotropic with respect to light inclined to the direction of the normal to the plane. Consequently, the viewing angle characteristics of the reflective display area for displaying black are substantially equivalent to those of the liquid crystal display device shown in FIG. 1.

The transmissive display area can display white as the liquid crystal layer is activated, and the stacked assembly of the liquid crystal layer in the transmissive display area and the second retardation plate becomes less isotropic. Since the viewing angle characteristics of contrast ratio are greatly affected by the viewing angle characteristics for displaying black, the viewing angle characteristics of contrast ratio are also substantially equivalent to those of the liquid crystal display device shown in FIG. 1.

The display of black on the reflective display area of the liquid crystal display device according to the exemplary embodiment will be described below.

If the first polarizer is on the observer side, then the first polarizer, the first retardation plate, and the liquid crystal layer in the reflective display area jointly make up a circular polarizer with respect to light applied from the direction of the normal to the plane. The contrast ratio of the reflective display area is increased by constructing them as a wide-range circular polarizer. Since Re1(0), Re1$x$(40), and Re1$y$(40) are approximately equal to each other, the first retardation plate functions as a retardation element whose retardation is close to Re1(0) in a wide angular range also with respect to light inclined 40 degrees from the direction normal to the plane. Furthermore, as Re1(0), Re1$x$(40), and Re1$y$(40) are approximately equal to each other, Re1(0), Re1$x$(θ) and Re1$y$(θ) are also approximately equal to each other to the extent which is necessary to achieve the advantages of the present invention within the range of θ required by the liquid crystal display device according to the pre-sent exemplary embodiment, with respect to light inclined at the angle of θ to the direction of the normal to the plane, and the first retardation plate functions as a retardation element whose retardation is close to Re1(0) in a wide angular range also with respect to light inclined at the angle of θ from the direction normal to the plane. This holds true not only for the first retardation plate, but also for the third retardation plate. Consequently, as the range and extent, to which the stacked assembly deviates from the circular polarizer with respect to the inclined light, are smaller than if a retardation plate, whose Re1(0), Re1$x$ (40), and Re1$y$(40) are not equal to each other, is employed, the viewing angle characteristics of the reflective display area for displaying black are better than the liquid crystal display device shown in FIG. 1.

The reflective display area can display white as the liquid crystal layer is activated and the stacked assembly of the first polarizer, the first retardation plate, and the liquid crystal layer in the reflective display area deviates from the circular polarizer or the wide-range circular polarizer. Since the viewing angle characteristics of contrast ratio are greatly affected by the viewing angle characteristics for displaying black, the viewing angle characteristics of contrast ratio of the reflective display area are better than those of the liquid crystal display device shown in FIG. 1.

The liquid crystal display device operates in the same manner as described above if the second polarizer is on the observer side. In this case, the second polarizer, the third retardation plate, the second retardation plate, and the liquid crystal layer in the reflective display area jointly make up a circular polarizer or a wide-range circular polarizer.

The fact that Re1(0), Re1$x$(40), Re1$y$(40), Re3(0), Re3$x$ (40), and Re3$y$(40) are approximately equal to each other means that the first retardation plate and the third retardation plate may comprise identical retardation plates. If the first retardation plate and the third retardation plate comprise identical retardation plates and the second retardation plate is included, then a lateral-electric-field-mode semitransmissive liquid crystal display device having wide viewing angle characteristics can be realized using three retardation plates of two types. The liquid crystal display device shown in FIG. 1 needs to use retardation plates of three types. Accordingly, the liquid crystal display device according to the exemplary example is less costly to manufacture because the number of types of retardation plates is smaller. Inasmuch as the first retardation plate and the third retardation plate comprise identical retardation plates, the wavelength dispersions of their refractive indexes are identical to each other, so that the retardations can sufficiently cancel each other out between the first retardation plate and the third retardation plate, and the contrast ratio of the transmissive display is prevented from suffering a reduction unlike the liquid crystal display device shown in FIG. 1.

The retardation of each of the first retardation plate, the liquid crystal layer in the transmission display area, the second retardation plate, and the third retardation plate may be approximately $\lambda/2$. Sign "$\lambda$" refers to wavelength.

It is known in the art that when linearly polarized light is applied to a $\lambda/2$ plate, the direction of vibration of the linearly polarized light rotates depending on the angle formed between the direction of vibration of the linearly polarized light and the slow axis of the $\lambda/2$ plate at the wavelength wherein the retardation is $\lambda/2$. For example, if there is a backlight on the side of the second polarizer, then when the transmissive display area of the liquid crystal display device according to the present exemplary embodiment is to display white, light applied from the backlight is converted into linearly polarized light by the second polarizer, and the linearly polarized light that is applied to the third retardation plate is transmitted, as is, to the second retardation light. As the linearly polarized light is transmitted as, is, to the first retardation plate and then to the first polarizer, the light can efficiently be utilized to the brightness level determined by the performance of the polarizers.

The Nz coefficient of the second retardation plate may be in the range from $-0.2$ to $0.4$. If the Nz coefficient of the second retardation plate is in the range from $-0.2$ to $0.4$, then $Re2x(40)$ and $ReLCy(40)$ are approximately equal to each other, and $Re2y(40)$ and $ReLCx(40)$ are approximately equal to each other, thereby achieving the desired viewing angle characteristics on the transmissive display area of the liquid crystal display device. The desired viewing angle characteristics on the transmissive display area mean a contrast ratio of 100 or more that is practically required at perpendicular azimuthal angles (azimuthal angles of about 0, 90, 180, and 270 degrees, for example) at the polar angle of 60 degrees (the direction of normal is at 0 degree).

The Nz coefficient of the second retardation plate may be approximately nil. With the liquid crystal device thus constructed, since the liquid crystal layers have Nz=1, when the Nz coefficient of the second retardation plate is nil, the oblique-view retardations of the second retardation plate and the liquid crystal layer in the transmissive display area which have their slow axes arranged substantially perpendicularly to each other have the same value in a wide range of oblique viewing angles. Thus, the oblique-view retardations can be canceled out. Consequently, the transmissive display area of the liquid crystal display device has increased viewing angle characteristics.

The Nz coefficients of the first retardation plate and the third retardation plate may be in the range from 0.3 to 0.8. If the Nz coefficients of the first retardation plate and the third retardation plate are in the range from 0.3 to 0.8, then $Re1(0)$, $Re1x(40)$, $Re1y(40)$, $Re3(0)$, $Re3x(40)$, and $Re3y(40)$ are approximately equal to each other, thereby achieving the desired viewing angle characteristics on the transmissive display area of the liquid crystal display device. The viewing angle characteristics on the reflective display area are also increased.

The Nz coefficients of the first retardation plate and the third retardation plate may be substantially 0.5. With the liquid crystal device thus constructed, when the Nz coefficient is substantially 0.5, $Re1(0)$, $Re1x(40)$, $Re1y(40)$, $Re3(0)$, $Re3x(40)$, and $Re3y(40)$ are more equal to each other, thereby making it possible to make the stacked assembly of the first retardation plate and the third retardation plate more nearly optically isotropic. As a result, the liquid crystal display device has better viewing angle characteristics for a transmissive display and also better viewing angle characteristics for a reflective display.

A disposition error with respect to the slow axis of the first retardation plate may be in the range from $-2.8$ degrees to $2.6$ degrees. A disposition error with respect to the slow axis of the second retardation plate may be in the range from $-2.6$ degrees to $2.6$ degrees. A disposition error with respect to the slow axis of the third retardation plate may be in the range from $-2.6$ degrees to $2.8$ degrees. A disposition error with respect to the orientation axis of the liquid crystal layer may be in the range from $-2.6$ degrees to $2.6$ degrees.

With the liquid crystal display device thus constructed, it is possible to achieve a front contrast ratio of 100 or more for a transmissive display which is practically required within each of the disposition errors of the first retardation plate, the second retardation plate, the third retardation plate, and the liquid crystal layer in the above structural examples.

A retardation error of the first retardation plate may be in the range from $-51.9$ nm to $48.9$ nm. A retardation error of the second retardation plate may be in the range from $-16.8$ nm to $15.7$ nm. A retardation error the third retardation plate may be in the range from $-48.0$ nm to $49.9$ nm. A retardation error of the liquid crystal layer may be in the range from $-16.1$ nm to $17.2$ nm.

With the liquid crystal display device thus constructed, it is possible to achieve the desired viewing angle characteristics for a transmissive display within each of the retardation errors of the first retardation plate, the second retardation plate, the third retardation plate, and the liquid crystal layer in the above structural examples.

An optical film according to the present exemplary embodiment comprises a stacked assembly of a polarizer and a retardation plate having a retardation of approximately $\lambda/2$ and an Nz coefficient in the range from 0.3 to 0.8, preferably approximately 0.5.

Alternatively, another optical film according to the present exemplary embodiment may comprise a stacked assembly of a polarizer, a retardation plate having a retardation of approximately $\lambda/2$ and an Nz coefficient in the range from 0.3 to 0.8, preferably approximately 0.5, and a retardation of approximately $\lambda/2$ and an Nz coefficient in the range from $-0.2$ to $0.4$, preferably approximately nil, which are successively stacked in the order named.

The optical film according to the present exemplary embodiment incorporated, as is, in the liquid crystal display device according to the present exemplary embodiment is effective for providing excellent display characteristics, particularly wide viewing angle characteristics.

Second Exemplary Embodiment

Figure 22:
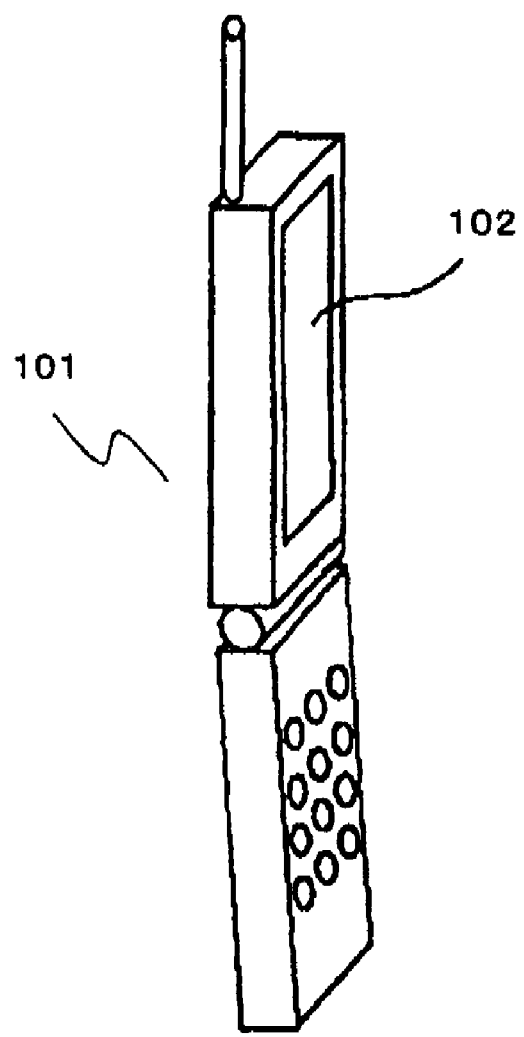
FIG. 22 is a perspective view of a mobile terminal device incorporating a liquid crystal display device according to a second exemplary embodiment of the present invention.

FIG. 22 shows in perspective a mobile terminal device incorporating a liquid crystal display device according to a second exemplary embodiment of the present invention.

As shown in FIG. 22, liquid crystal display device 102 according to the second exemplary embodiment of the present invention is incorporated in mobile terminal device 101. The liquid crystal display device according to the present invention is applicable not only to mobile telephone sets, but also to various mobile terminal devices including PDAs (Personal Digital Assistants), game machines, digital cameras, digital video cameras, etc. The liquid crystal display device according to the present invention is also applicable not only to mobile terminal devices, but also to various terminal devices including notebook personal computers, cash dispensers, automatic dispensing machines, etc.

What is claimed is:

1. A liquid crystal device comprising first and second substrates and liquid crystal layers sandwiched between said first and second substrates, and including a reflective display area and a transmissive display area as pixel areas, the arrangement being such that said liquid crystal layer in at least said transmissive display area can be energized in a lateral electric field mode when a voltage is applied parallel to the plane of said substrates, wherein a first retardation plate and a first polarizer are stacked on a surface of said first substrate remote from said liquid crystal layer in an order toward said first substrate, and a second retardation plate, a third retardation plate, and a second polarizer are stacked on a surface of said second substrate remote from said liquid crystal layer in an order toward said second substrate;

said first retardation plate and said third retardation plate have respective slow axes extending substantially perpendicularly to each other, and said second retardation plate and said liquid crystal layer in said transmissive display area have a slow axis and an orientation axis, respectively, extending substantially perpendicularly to each other;

the retardation with respect to light applied from the direction normal to said first retardation plate to said first retardation plate is defined as Re1(0), the retardation with respect to light applied from the air to said first retardation plate at an angle of 40 degrees from the normal direction to said first retardation plate toward the slow axis of said first retardation plate is defined as Re1$x$(40), and the retardation with respect to light applied from the air to said first retardation plate at an angle of 40 degrees from the direction normal to said first retardation plate toward a direction perpendicular to the slow axis of said first retardation plate is defined as Re1$y$(40);

the retardation with respect to light applied from the direction normal to said second retardation plate to said second retardation plate is defined as Re2(0), the retardation with respect to light applied from the air to said second retardation plate at an angle of 40 degrees from the direction normal to said second retardation plate toward the slow axis of said second retardation plate is defined as Re2$x$(40), and the retardation with respect to light applied from the air to said second retardation plate at an angle of 40 degrees from the direction normal to said second retardation plate toward a direction perpendicular to the slow axis of said second retardation plate is defined as Re2$y$(40);

the retardation with respect to light applied from the direction normal to said third retardation plate to said third retardation plate is defined as Re3(0), the retardation with respect to light applied from the air to said third retardation plate at an angle of 40 degrees from the direction normal to said third retardation plate toward the slow axis of said third retardation plate is defined as Re3$x$(40), and the retardation with respect to light applied from the air to said third retardation plate at an angle of 40 degrees from the direction normal to said third retardation plate toward a direction perpendicular to the slow axis of said third retardation plate is defined as Re3$y$(40);

the retardation with respect to light applied from the direction normal to said liquid crystal layer in said transmissive display area to said liquid crystal layer is defined as ReLC(0), the retardation with respect to light applied from the air to said liquid crystal layer at an angle of 40 degrees from the direction normal to said liquid crystal layer toward the orientation axis of said liquid crystal layer is defined as ReLC$x$(40), and the retardation with respect to light applied from the air to said liquid crystal layer at an angle of 40 degrees from the direction normal to said liquid crystal layer toward a direction perpendicular to the orientation axis of said liquid crystal layer is defined as ReLC$y$(40); and Re1(0) and Re3(0) are approximately equal to each other, Re1(0), Re1$x$(40), Re1$y$(40), Re3(0), Re3$x$(40), and Re3$y$(40) are approximately equal to each other, Re2(0) and ReLC(0) are approximately equal to each other, Re2$x$(40) and ReLC$y$(40) are approximately equal to each other, and Re2$y$(40) and ReLC$x$(40) are approximately equal to each other.

2. The liquid crystal display device according to claim 1, wherein the retardation of each of said first retardation plate, said liquid crystal layer in said transmissive display area, said second retardation plate and said third retardation plate is approximately $\lambda/2$.

3. The liquid crystal display device according to claim 1, wherein said second retardation plate has an Nz coefficient in the range from −0.2 to 0.4.

4. The liquid crystal display device according to claim 1, wherein said second retardation plate has an Nz coefficient of substantially nil.

5. The liquid crystal display device according to claim 1, wherein each of said first retardation plate and said third retardation plate has an Nz coefficient in the range from 0.3 to 0.8.

6. The liquid crystal display device according to claim 1, wherein each of said first retardation plate and said third retardation plate has an Nz coefficient of approximately 0.5.

7. The liquid crystal display device according to claim 1, wherein a disposition error with respect to the slow axis of said first retardation plate is in the range from −2.8 degrees to 2.6 degrees, a disposition error with respect to the slow axis of said second retardation plate is in the range from −2.6 degrees to 2.6 degrees, a disposition error with respect to the slow axis of said third retardation plate is in the range from −2.6 degrees to 2.8 degrees, and a disposition error with respect to the orientation axis of said liquid crystal layer is in the range from −2.6 degrees to 2.6 degrees.

8. The liquid crystal display device according to claim 1, wherein a retardation error of said first retardation plate is in the range from −51.9 nm to 48.9 nm, a retardation error of said second retardation plate is in the range from −16.8 nm to 15.7 nm, a retardation error of said third retardation plate is in the range from −48.0 nm to 49.9 nm and a retardation error of said liquid crystal layer is in the range from −16.1 nm to 17.2 nm.

9. A terminal device incorporating a liquid crystal display device according to claim 1.

* * * * *